(12) United States Patent
Sahasi et al.

(10) Patent No.: US 11,962,857 B2
(45) Date of Patent: Apr. 16, 2024

(54) METHODS, SYSTEMS, AND APPARATUSES FOR CONTENT RECOMMENDATIONS BASED ON USER ACTIVITY

(71) Applicant: ON24, Inc., San Francisco, CA (US)

(72) Inventors: Jayesh Sahasi, San Francisco, CA (US); Jairo Diaz, Barranquilla (CO); Brian Streit, San Francisco, CA (US); Stephen Andrew Sims, San Francisco, CA (US)

(73) Assignee: ON24, Inc., San Francisco, CA (US)

( * ) Notice: Subject to any disclaimer, the term of this patent is extended or adjusted under 35 U.S.C. 154(b) by 104 days.

(21) Appl. No.: 17/547,538

(22) Filed: Dec. 10, 2021

(65) Prior Publication Data
US 2023/0188792 A1      Jun. 15, 2023

(51) Int. Cl.
*H04N 21/466*  (2011.01)
*H04N 21/45*   (2011.01)
*H04N 21/482*  (2011.01)

(52) U.S. Cl.
CPC ..... *H04N 21/4668* (2013.01); *H04N 21/4532* (2013.01); *H04N 21/4666* (2013.01); *H04N 21/4826* (2013.01)

(58) Field of Classification Search
None
See application file for complete search history.

(56) References Cited

U.S. PATENT DOCUMENTS

| | | | |
|---|---|---|---|
| 6,560,637 B1 | 5/2003 | Dunlap et al. | |
| 9,396,195 B1* | 7/2016 | Beguelin | H04N 21/4788 |
| 11,037,222 B1 | 6/2021 | Natesh et al. | |
| 2003/0174160 A1 | 9/2003 | Deutscher et al. | |
| 2005/0015719 A1 | 1/2005 | Marchon et al. | |
| 2013/0218806 A1* | 8/2013 | Daly | G06Q 40/06 705/36 R |
| 2015/0278351 A1 | 10/2015 | Messina et al. | |
| 2018/0268318 A1* | 9/2018 | Matam | G06N 7/01 |
| 2019/0179915 A1 | 6/2019 | Yoon et al. | |
| 2021/0304285 A1 | 9/2021 | Alahmady | |
| 2021/0406325 A1* | 12/2021 | Sinn | G06N 20/00 |

FOREIGN PATENT DOCUMENTS

JP        2016167290 A       9/2016

OTHER PUBLICATIONS

International Search Report and Written Opinion of application No. PCT/US2022/052210 dated Apr. 10, 2023.

* cited by examiner

*Primary Examiner* — James R Marandi
(74) *Attorney, Agent, or Firm* — Ballard Spahr LLP

(57) ABSTRACT

Methods, systems, and apparatuses for content recommendations based on user activity data are described herein. An analytics subsystem may receive first activity data. The first activity may be indicative of a plurality of first engagements with a first plurality of media assets. At least one machine learning model may be configured to receive an input of activity data, such as the first activity data, and to determine at least one content recommendation on that basis. The at least one content recommendation may comprise a recommendation for at least one media asset. The at least one media asset may be associated with at least one media asset classification. The analytics subsystem may send the at least one content recommendation.

20 Claims, 20 Drawing Sheets

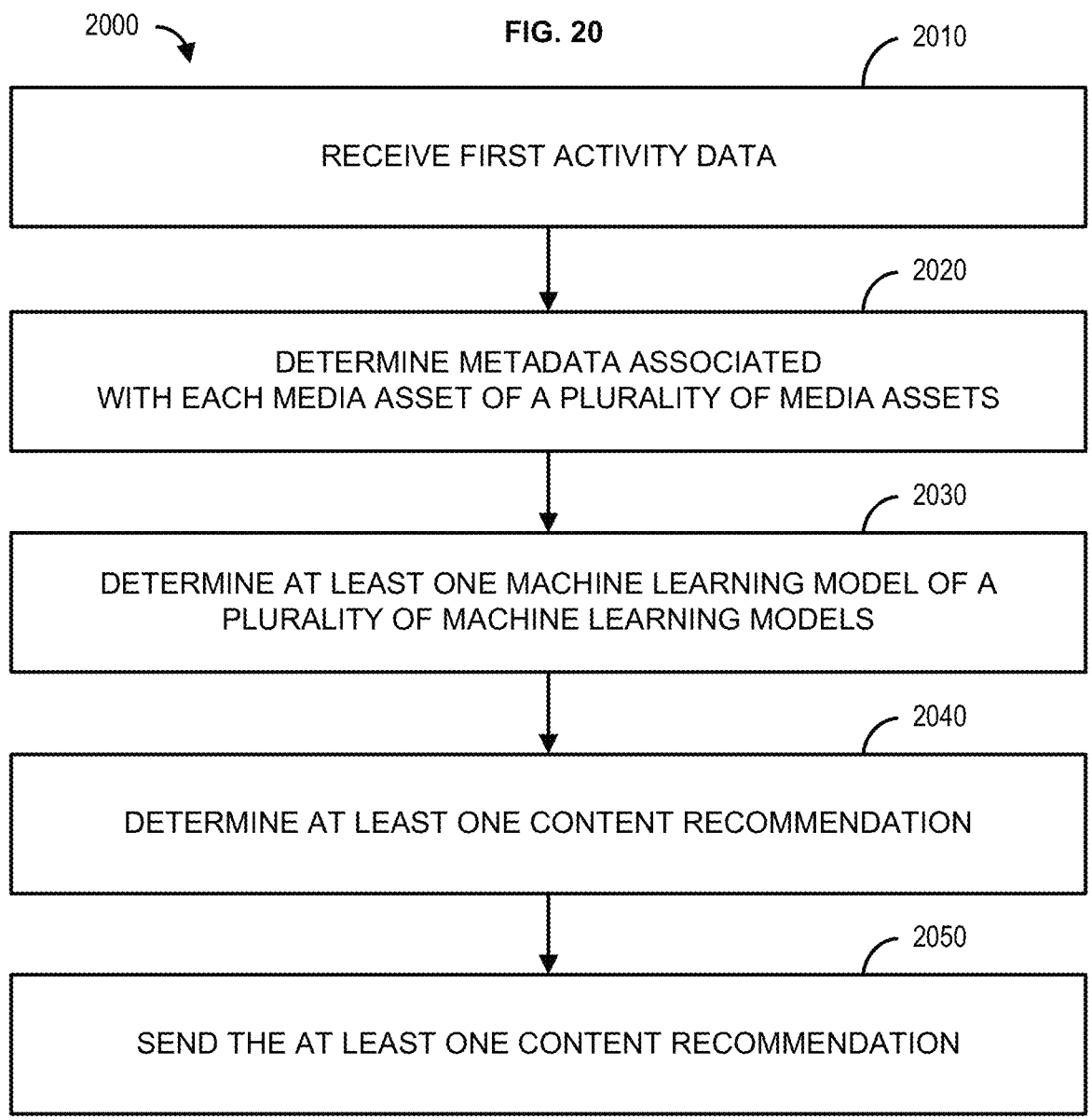

METHODS, SYSTEMS, AND APPARATUSES FOR CONTENT RECOMMENDATIONS BASED ON USER ACTIVITY

BACKGROUND

Content platforms may provide a variety of content for users, such as for example, videos, slideshows, reading material, audio presentations, webinars, etc. When a plethora of content is available for users to consume, content platforms may use recommendation systems when providing content recommendations to their users. Such existing recommendation systems may provide content recommendations based on user surveys, viewership/participant statistics, etc. However, these existing recommendation systems do not sufficiently account for user activity/behavior. As a result, these existing recommendation systems do not adequately match content to users. These and other considerations are discussed herein.

SUMMARY

It is to be understood that both the following general description and the following detailed description are exemplary and explanatory only and are not restrictive. Methods, systems, and apparatuses for content recommendations based on user activity data are described herein. Methods, systems, and apparatuses for content recommendations based on user activity data are described herein. A distribution platform may comprise a system of computing devices, servers, software, etc., that is configured to present media assets (e.g., content) at user devices. In one example embodiment, an analytics subsystem may provide at least one content recommendation to a user device. The analytics subsystem may receive first activity data. The first activity may be indicative of a plurality of first engagements with a first plurality of media assets. The analytics subsystem may determine metadata associated with each media asset of the first plurality of media assets. The metadata associated with each media asset of the first plurality of media assets may comprise at least one first media asset classification. The at least one first media asset classification may correspond to different classifications of media assets. Each of those classifications may be associated with a type of user behavior.

The analytics subsystem may determine, based on the at least one first media asset classification, at least one machine learning model. The analytics subsystem may determine at least one content recommendation. For example, once trained, the at least one machine learning model may be configured to receive an input of activity data, such as the first activity data, and to determine the at least one content recommendation on that basis. The at least one content recommendation may comprise a recommendation for at least one media asset. The at least one media asset may be associated with at least one second media asset classification, which may differ from the at least one first media asset classification. The analytics subsystem may send the at least one content recommendation. For example, the analytics subsystem may send the at least one content recommendation to the user device via the client application. The analytics subsystem may send the at least one content recommendation to the first user device as a notification, an instruction, a message, a combination thereof, and/or the like.

Additional advantages will be set forth in part in the description which follows or may be learned by practice. The advantages will be realized and attained by means of the elements and combinations particularly pointed out in the appended claims.

BRIEF DESCRIPTION OF THE DRAWINGS

The accompanying drawings, which are incorporated in and constitute a part of the present description, explain the principles of the methods, systems, and apparatuses described herein:

FIG. 20 illustrates a flowchart for an example method, in accordance with one or more embodiments of this disclosure.

DETAILED DESCRIPTION

Figure 1:
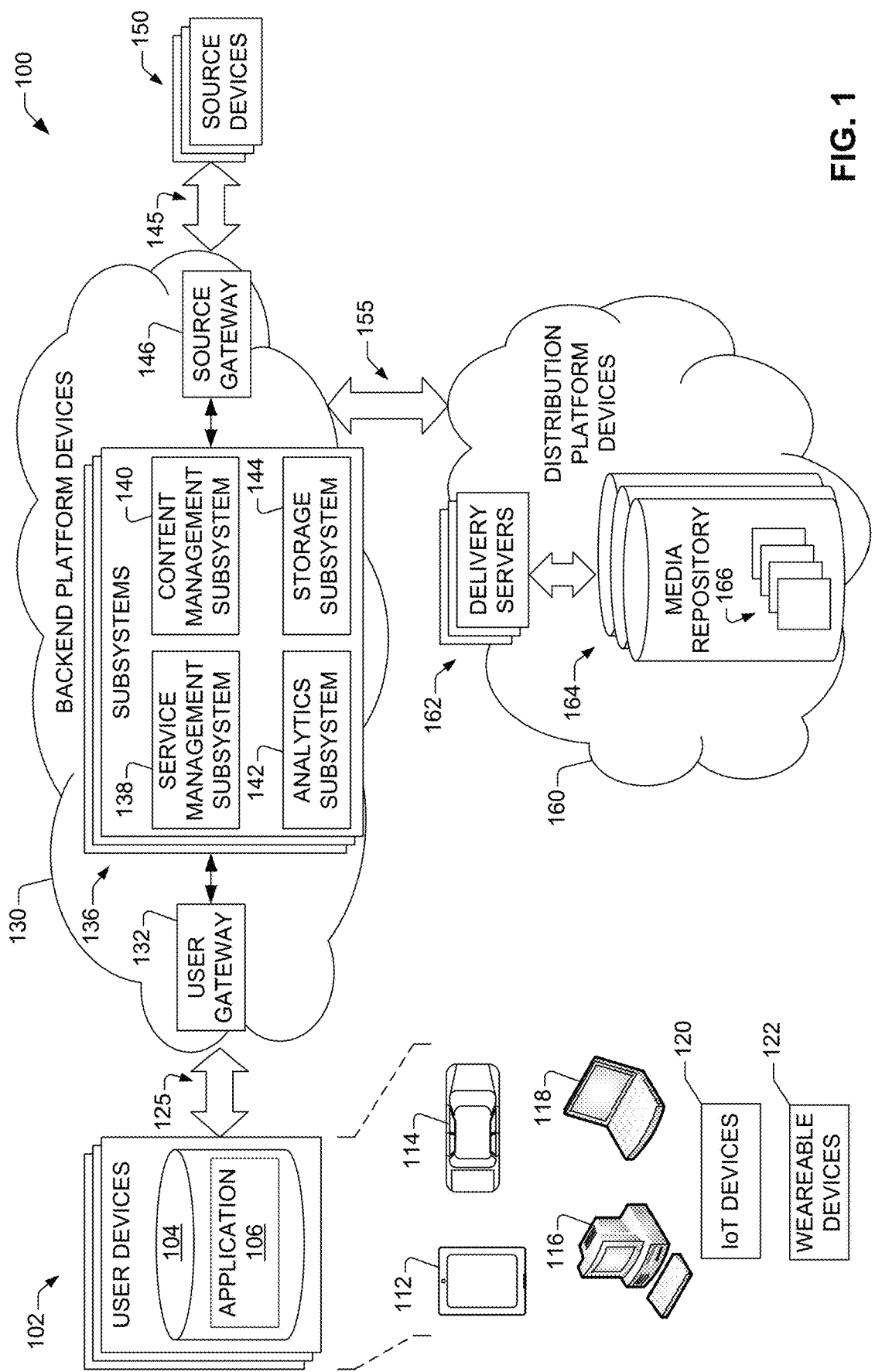
FIG. 1 illustrates an example of an operational environment that includes a presentation platform for presentation of digital content, in accordance with one or more embodiments of this disclosure.

As used in the specification and the appended claims, the singular forms "a", "an", and "the" include plural referents unless the context clearly dictates otherwise. Ranges may be expressed herein as from "about" one particular value, and/or to "about" another particular value. When such a range is expressed, another configuration includes from the one particular value and/or to the other particular value. Similarly, when values are expressed as approximations, by use of the antecedent "about", it will be understood that the particular value forms another configuration. It will be further understood that the endpoints of each of the ranges are significant both in relation to the other endpoint, and independently of the other endpoint.

"Optional" or "optionally" means that the subsequently described event or circumstance may or may not occur, and that the description includes cases where said event or circumstance occurs and cases where it does not.

Throughout the description and claims of this specification, the word "comprise" and variations of the word, such as "comprising" and "comprises", means "including but not limited to", and is not intended to exclude, for example, other components, integers or steps. "Exemplary" means "an example of" and is not intended to convey an indication of a preferred or ideal configuration. "Such as" is not used in a restrictive sense, but for explanatory purposes.

It is understood that when combinations, subsets, interactions, groups, etc. of components are described that, while specific reference of each various individual and collective combinations and permutations of these may not be explicitly described, each is specifically contemplated and described herein. This applies to all parts of this application including, but not limited to, steps in described methods. Thus, if there are a variety of additional steps that may be performed it is understood that each of these additional steps may be performed with any specific configuration or combination of configurations of the described methods.

As will be appreciated by one skilled in the art, hardware, software, or a combination of software and hardware may be implemented. Furthermore, a computer program product on a computer-readable storage medium (e.g., non-transitory) having processor-executable instructions (e.g., computer software) embodied in the storage medium. Any suitable computer-readable storage medium may be utilized including hard disks, CD-ROMs, optical storage devices, magnetic storage devices, memristors, Non-Volatile Random-Access Memory (NVRAM), flash memory, or a combination thereof.

Throughout this application reference is made to block diagrams and flowcharts. It will be understood that each block of the block diagrams and flowcharts, and combinations of blocks in the block diagrams and flowcharts, respectively, may be implemented by processor-executable instructions. These processor-executable instructions may be loaded onto a general-purpose computer, special purpose computer, or other programmable data processing apparatus to produce a machine, such that the processor-executable instructions which execute on the computer or other programmable data processing apparatus create a device for implementing the functions specified in the flowchart block or blocks.

These processor-executable instructions may also be stored in a computer-readable memory that may direct a computer or other programmable data processing apparatus to function in a particular manner, such that the processor-executable instructions stored in the computer-readable memory produce an article of manufacture including processor-executable instructions for implementing the function specified in the flowchart block or blocks. The processor-executable instructions may also be loaded onto a computer or other programmable data processing apparatus to cause a series of operational steps to be performed on the computer or other programmable apparatus to produce a computer-implemented process such that the processor-executable instructions that execute on the computer or other programmable apparatus provide steps for implementing the functions specified in the flowchart block or blocks.

Blocks of the block diagrams and flowcharts support combinations of devices for performing the specified functions, combinations of steps for performing the specified functions and program instruction means for performing the specified functions. It will also be understood that each block of the block diagrams and flowcharts, and combinations of blocks in the block diagrams and flowcharts, may be implemented by special purpose hardware-based computer systems that perform the specified functions or steps, or combinations of special purpose hardware and computer instructions.

Methods, systems, and apparatuses for content recommendations based on user activity data are described herein. A distribution platform may comprise a system of computing devices, servers, software, etc., that is configured to present media assets (e.g., content) at user devices. In one example embodiment, an analytics subsystem may provide at least one content recommendation to a user device.

The analytics subsystem may receive activity data indicative of a plurality of engagements of the user device with a plurality of media assets. The analytics subsystem may receive the activity data via a client application executing on the user device. The analytics subsystem may receive first activity data. The first activity may be indicative of a plurality of first engagements with a first plurality of media assets. The analytics subsystem may determine metadata associated with each media asset of the first plurality of media assets. For example, the metadata associated with each media asset of the first plurality of media assets may comprise at least one first media asset classification. The at least one first media asset classification may correspond to different classifications of media assets. Each of those classifications may be associated with a type of user behavior.

The analytics subsystem may determine, based on the at least one first media asset classification, at least one machine learning model of a plurality of machine learning models. Each of the plurality of machine learning models may be trained using training activity data/engagements and/or training recommendation data. The at least one machine learning model may be trained such that an input of the first activity data may result in an output of at least one content recommendation. For example, the at least one content recommendation may comprise a recommendation for at least one media asset. The at least one media asset may be associated with at least one second media asset classification, which may differ from the at least one first media asset classification.

The analytics subsystem may determine the at least one content recommendation. For example, once trained, the at least one machine learning model may be configured to receive an input of activity data, such as the first activity data, and to determine the at least one content recommendation on that basis. The analytics subsystem may send the at least one content recommendation. For example, the analytics subsystem may send the at least one content recommendation to the user device via the client application. The analytics subsystem may send the at least one content recommendation to the first user device as a notification, an instruction, a message, a combination thereof, and/or the like. Other examples are possible as well.

FIG. 1 illustrates an example of an operational environment 100 that includes a presentation platform for presentation of digital content, in accordance with one or more embodiments of this disclosure. The presentation platform can include backend platform devices 130 and, in some cases, distribution platform devices 160. In other cases, the distribution platform devices 160 can pertain to a third-party provider. Regardless of its type, the backend platform devices 130 and the distribution platform devices 160 can be functionally coupled by a network architecture 155. The network architecture 155 can include one or a combination of networks (wireless or wireline) that permit one-way and/or two-way communication of data and/or signaling. The digital content can include, for example, 2D content, 3D content, or 4D content or another type of immersive content. Besides digital content that is static and, thus, can be consumed in time-shifted fashion, digital content that can be created and consumed contemporaneously also is contemplated.

The digital content can be consumed by a user device of a group of user devices 102. The user device can consume the content as part of a presentation that is individual or as part of a presentation involving multiple parties. Regardless of its type a presentation can take place within a session to consume content. Such a session can include, for example, a call session, videoconference, a downstream lecture (a seminar, a class, a tutorial, or the like, for example).

The group of user devices 102 can include various types of user devices, each having a particular amount of computing resources (e.g., processing resources, memory resources, networking resources, and I/O elements) to consume digital content via a presentation. In some cases, the group of user devices 102 can be homogeneous, including devices of a particular type, such as high-end to medium-end mobile devices, IoT devices 120, or wearable devices 122. A mobile device can be embodied in, for example, a handheld portable device 112 (e.g., a smartphone, a tablet, or a gaming console); a non-handheld portable device 118 (e.g., a laptop); a tethered device 116 (such as a personal computer); or an automobile 114 having an in-car infotainment system (IVS) having wireless connectivity. A wearable device can be embodied in goggles (such as augmented-reality (AR) goggles) or a helmet mounted display device, for example. An IoT device can include an appliance having wireline connectivity and/or wireless connectivity. In other cases, the group of user device 102 can be heterogeneous, including devices of a various types, such as a combination of high-end to medium-end mobile devices, wearable devices, and IoT devices.

To consume digital content, a user device of the group of user devices 102 can execute a client application 106 retained in a memory device 104 that can be present in the user device. A processor (not depicted in FIG. 1) integrated into the user device can execute the application 106. The client application 106 can include a mobile application or a web browser, for example. Execution of the client application 106 can cause initiation of a presentation session. Accordingly, execution of the client application 106 can result in the exchange of data and/or signaling with a user gateway 132 included in the backend platform devices 130. The user device and the user gateways 132 can be functionally coupled by a network architecture 125 that can include one or a combination of networks (wireless or wireline) that permit one-way and/or two-way communication of data and/or signaling. Specifically, the user device can receive data defining the digital content. Such data can be embodied in one or multiple streams defining respective elements of the digital content. For instance, a first stream can define imaging data corresponding to video content, and a second stream can defined audio data corresponding to an audio channel of the digital content. In some cases, a third stream defining haptic data also can be received. The haptic data can dictate elements of 4D content or another type of immersive content.

The user gateway 132 can provide data defining the digital content by identifying a particular deliver server of multiple delivery servers 162 included in the distribution platform devices 160, and then supplying a request for content to that particular delivery server. That particular delivery server can be embodied in an edge server in cases in which the distributed platform devices 160 include a content delivery network (CDN). In some configurations, the particular delivery server can have a local instance of digital content to be provided to a user device. The local instance of digital content can be obtained from one or several media repositories 164, where each one of the media repositories 164 contain media assets 166. Such assets can be static and can be consumed in time-shifted fashion. At least some of the media assets 166 can be specific to a media repository or can be replicated across two or more media repositories. The media assets 166 can include, for example, a video segment, a web cast, an RSS feed, or another type of digital content that can be streamed by the user gateway 132 and/or other devices of the backend platform devices 130. The media assets 166 are not limited to digital content that can be streamed. In some cases, at least some of the media assets 166 can include static digital content, such as an image or a document.

The particular delivery server can provide digital content to the user gateway 132 in response to the request for content. The user gateway 132 can then send the digital content to a user device. The user gateway 132 can send the digital content according to one of several communication protocols (e.g., IPv4 or IPv6, for example).

In some embodiments, the digital content that is available to a user device or set of multiple user devices (e.g., a virtual classroom or a recital) can be configured by content management subsystem 140. To that end, the content management subsystem 140 can identify corpora of digital content applicable to the user device(s). Execution of the client application 106 can result in access to a specific corpus of digital content based on attributes of the user device or a combination of the set of multiple devices.

The subsystems 136 also include an analytics subsystem 142 that can generate intelligence and/or knowledge about content consumption behavior of a user device (e.g., one of the user devices 102). The analytics subsystem 142 can retain the intelligence and/or knowledge in a storage subsystem 144. Both the intelligence and knowledge can be generated using historical data identifying one or different types of activities of the user device. The activities can be related to consumption of digital content. In some configurations, the client application 106 can send activity data during consumption of digital content. The activity data can identify an interaction or a combination of interactions of the user device with the digital content. An example of an interaction is trick play (e.g., fast-forward or rewind) of the digital content. Another example of an interaction is reiterated playback of the digital content. Another example of an interaction is aborted playback, e.g., playback that is terminated before the endpoint of the digital content. Yet another example of the interaction is submission (or "share") of the digital content to a user account in a social media platform. Thus, the activity data can characterize engagement with the digital content.

The analytics subsystem 142 can then utilize the activity data to assess a degree of interest of the user device on the digital content (e.g., media assets). To that end, in some embodiments, the analytics subsystem 142 can train a machine learning model to discern a degree of interest on digital content among multiple interest levels. The machine learning model can be trained using unsupervised training, for example, and multiple features determined using digital content and the activity data. By applying the trained machine learning model to new activity data, an interest attribute can be generated. An interest attribute may represent one of the multiple interest levels and, thus, quantifies interest on the digital content on part of the user device.

By evaluating interest of a user device on different types of digital content, the analytics subsystem 142 can generate a user profile for the user device. Such an evaluation can be implemented for multiple user devices and therefore multiple user profiles can be generated. A user profile may comprise a user interest cloud (UIC). A UIC can identify types of digital content—and/or features thereof—likely to be of interest to a user corresponding to a UIC and therefore likely to be consumed by the user via their user device. For example, a UIC may comprise a tag cloud that includes interest tags, which correspond to respective interests of a user. An interest of a user may be derived from user activity data. For example, the analytics subsystem 142 may receive activity data indicative of a plurality of engagements of a user device with a plurality of media assets (e.g., digital content). The analytics subsystem 142 may receive the activity data via the client application 106 executing on the user device. Each of the plurality of media assets may comprise a plurality of content features, as further described herein. The analytics subsystem 142 may generate a UIC associated with that particular user and/or user device. The UIC may include at least one content feature of the plurality of content features (e.g., representing content features associated with content with which the user has engaged). The UIC may also include, as further described herein, at least one interest attribute representing a level of interest for each of the media assets consumed by the user/user device. As further described herein, the UIC can be used by a machine learning model to identify one or more of the media assets 166 that are likely to be of interest to a user corresponding to the UIC.

Figure 2:
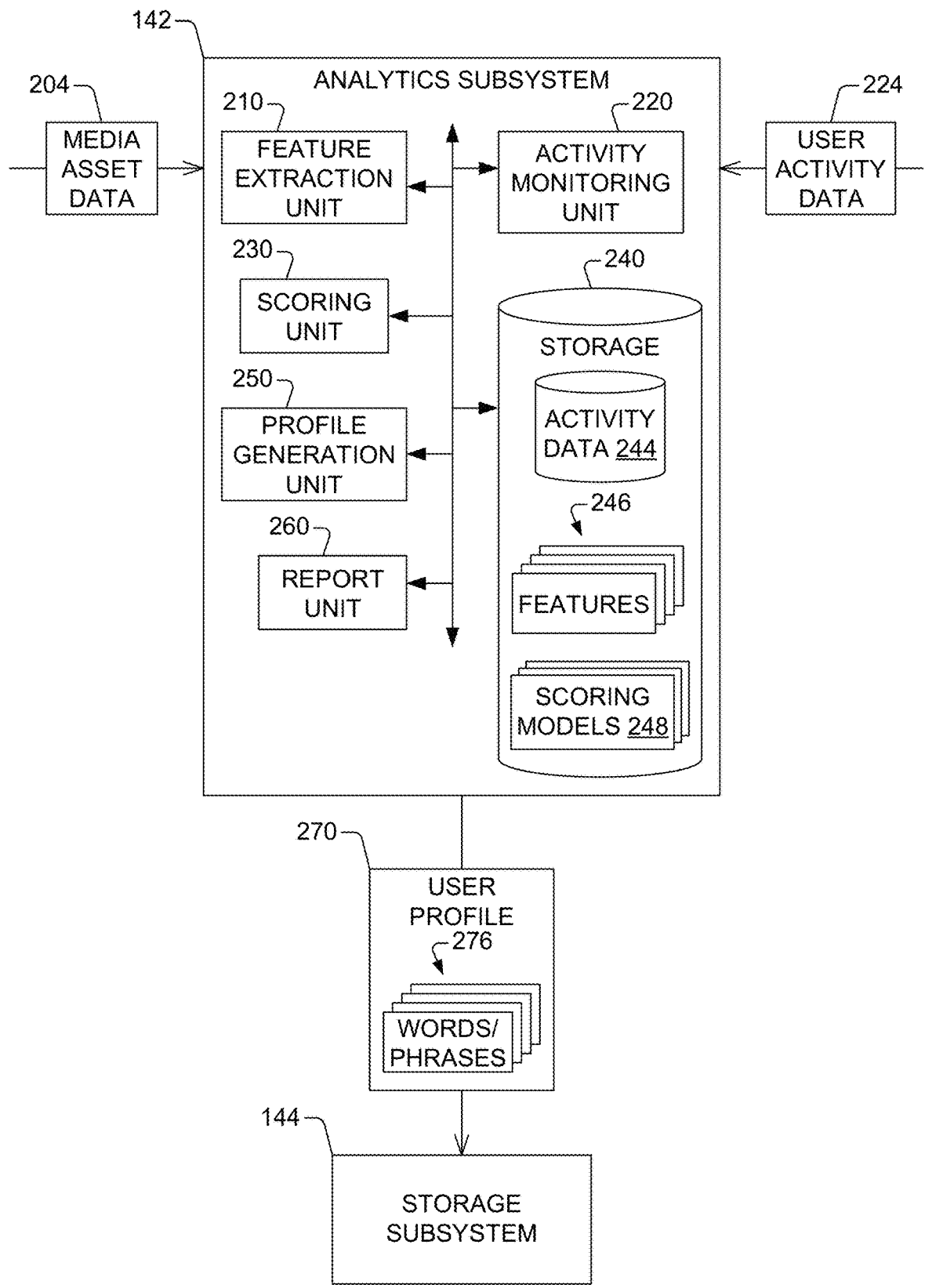
FIG. 2 illustrates an example of an analytics subsystem included in a presentation platform for presentation of digital content, in accordance with one or more embodiments of this disclosure.

As shown in FIG. 2, the analytics subsystem 142 can include multiple units that permit generating a user profile. The analytics subsystem 142 can include a feature extraction unit 210 that can receive media asset data 204 defining a media asset of the media assets 166 (FIG. 1). As mentioned, the media asset can be a webinar, a video, a document, a webpage, a promotional webpage, or similar asset. The feature extraction unit 210 can then determine one or several content features for the media asset. Examples of content features that can be determined for the media asset include, content type (video, webinar, pdf, web page, etc.), content rating; author information (e.g., academic biography of a lecturer); date of creation; content tag; content category; content filter; language of the content; content description Simply as an example, the content description can include an abstract or a summary, such as a promotional summary, a social media summary, and an on-demand summary. The feature extraction unit 210 can determine the content feature(s) for the media asset prior to consumption of the media asset. In this way, the determination of a user profile can be more efficient. The feature extraction unit 210 can retain data indicative of the determined content feature(s) in storage 240, within memory elements 246 (represented features 246).

In addition, the analytics subsystem 142 can include an activity monitoring unit 220 that can receive user activity data 224 for a user device. As mentioned, the client application 106 (FIG. 1) includes in the user device can send the user activity data 224. The user activity data 224 can identify an interaction or a combination of interactions of the user device with the media asset. Again, an interaction can include one of trick play, reiterated playback, aborted play, social media share, or similar. The activity monitoring unit 220 can then generate one or several engagement features using the user activity data 224. In some configurations, an engagement feature can quantify the engagement of the user device with the media asset. For instance, the engagement feature can be a numerical weight ascribed to a particular type of user activity data 224. For example, aborted playback can be ascribed a first numerical weight and social media share can be ascribed a second numerical weight, where the first numerical weight is less than the second numerical weight. Other numerical weights can be ascribed to reiterated playback and trick-play. For such interactions, the number of reiterations and the time spent consuming the media asset due to trick-play can determine the magnitude of respective numerical weights. The feature extraction unit 210 can retain data indicative of the determined engagement feature(s) in the storage 240, within the features 244.

The analytics subsystem 142 also can include a scoring unit 230 that can determine an interest level for the media asset corresponding to the determined content feature(s) and engagement feature(s). To that end, the scoring unit can apply a scoring model 248 to those features, where the scoring model 248 can be a trained machine learning model that resolves a multi-class classification task. Specifically, in some embodiments, the scoring unit 230 can generate a feature vector including determined content feature(s) and engagement feature(s) for the media asset. A feature vector may be associated with a particular user device(s). A feature vector may comprise a quantification of a level/amount of engagement with each media asset and/or a numerical weight associated with an engagement feature as described herein. The number and arrangement of items in such a feature vector may be the same as those of features vectors used during training of the scoring model 248. The scoring unit 230 can then apply the scoring model 248 to the feature vector to generate an interest attribute representing a level of interest on the media asset. The interest attribute can be a numerical value (e.g., an integer number) or textual label that indicates the level of interest (e.g., "high", "moderate", and "low").

A profile generation unit 250 can determine, in some instances, that an interest attribute for a media asset meets or exceeds a defined level of interest. In those instances, the profile generation unit 250 can select words or phrases, or both, from content features determined for the media asset. Simply for purposes of illustrations, the profile generation unit 250 can select one or more categories of the media asset and a title of the media asset as is defined within a description of the media asset. A selected word or phrase may, for example, represent an interest of the user device on the media asset. The profile generation unit 250 can then generate a user profile 270 that includes multiple entries 276, each one corresponding to a selected word or phrase. The profile generation unit 250 can then retain the user profile 270 in the storage subsystem 144.

Figure 3A:
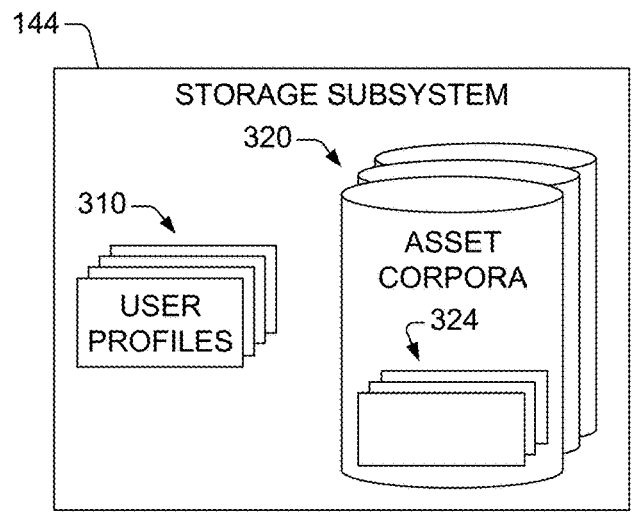
FIG. 3A illustrates an example of a storage subsystem included in a presentation platform for presentation of digital content, in accordance with one or more embodiments of this disclosure.

By receiving user activity data 224 from different user devices, the analytics subsystem 142 can generate respective user profiles for those user devices. Thus, as is illustrated in FIG. 3A, the storage subsystem 144 can include user profiles 310. In addition, or in some embodiments, the content management subsystem 140 (FIG. 1) can then configure digital content (e.g., media assets) that are of interest to the user device. As a result, a particular group of the media assets 166 can be made available to a particular user device. Such a group may define a corpus of digital content.

In some embodiments, a user profile and a corpus of digital content for a user device also can comprise a UIC for the user device. In addition, or in other embodiments, the content management subsystem 140 can configure one or more functions to interact with digital content. Those function(s) can include, for example, one or a combination of translation functionality (automated or otherwise), social-media distribution, formatting functionality, or the like. The content management subsystem 140 can include at least one of the function(s) in the user interest cloud.

The content management subsystem 140 can retain data defining a UIC within the storage subsystem 144. Accordingly, the storage subsystem 144 can include asset corpora 320 (FIG. 3A) that retains a corpora of media assets 324 for respective user profiles 310. Multiple memory devices can comprise the asset corpora 320. Those memory devices can be distributed geographically, in some embodiments. One or many database management servers (not depicted in FIG. 3A) can manage the cloud storage 320. The database management server(s) can be included in the content management subsystem 140 (FIG. 1).

At least a subset of the user profiles 320 can correspond to respective ones of the interest cumuli 314. In other words, a first user profile of the user profiles 320 can be logically associated with a first interest cumulus of the interest cumuli 314, a second user profile can be logically associated with a second interest cumulus of the interest cumuli 316, and so forth. A logical association can be provided by a unique identifier (ID) for an interest cumulus corresponding to a user profile. The unique ID can be retained in the user profile.

As described herein, each UIC may be derived from user activity data 224 indicative of a plurality of engagements of a user device with a plurality of media assets (e.g., digital content). The analytics subsystem 142 may receive the activity data via the client application 106 executing on the user device. The analytics subsystem 142 may generate a UIC associated with that particular user and/or user device. The UIC may include at least one content feature of a plurality of content features (e.g., representing content features associated with content with which the user has engaged). The UIC may also include, as further described herein, at least one interest attribute representing a level of interest for each of the media assets consumed by the user/user device. Each of the plurality of media assets 166 may comprise a plurality of content features including, but not limited to, at least one of: content format/type (e.g., video, audio, webcast, webinar, PDF, webpage, etc.); content rating (e.g., an audience/aggregated review score, such as 4/5 stars, 88%, etc.); demographic information associated with presenters; date of creation/upload/availability; engagement score of other users (e.g., as described herein with reference to FIG. 5); metadata (e.g., tags, categories, filters, etc.); description/abstract/summary; language(s) spoken/shown; functionality feature(s), as further described herein; a combination thereof, and/or the like.

Figure 3B:
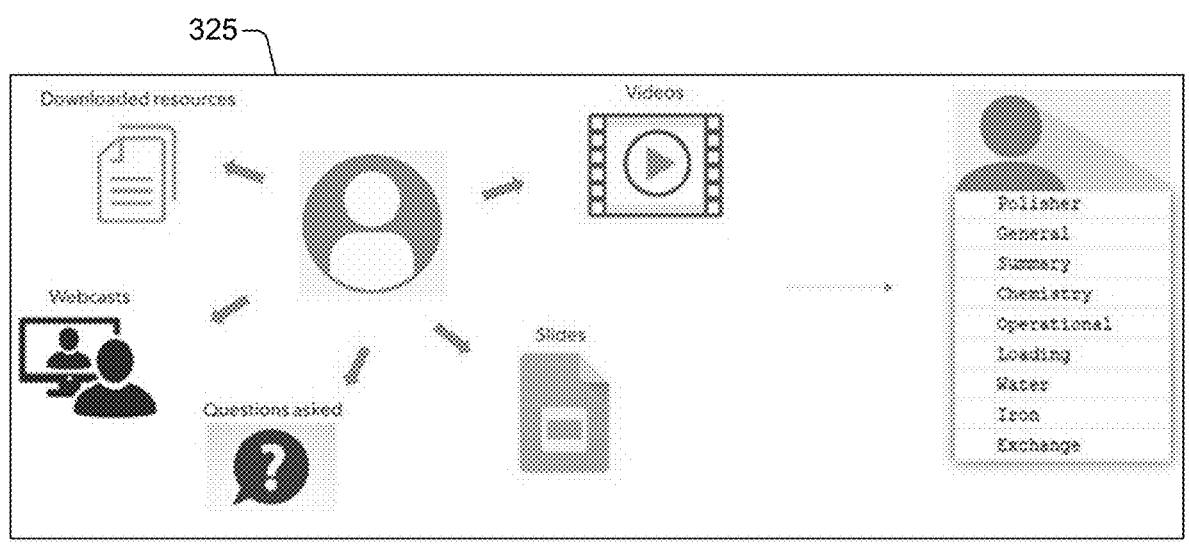
FIG. 3B illustrates an example visual representation of a user interest cloud, in accordance with one or more embodiments of this disclosure.

FIG. 3B shows an example visual representation 325 of a UIC. As shown in the visual representation 325, the UIC may be based on, for example, the user activity data 224 indicative of the plurality of engagements with one or more of the plurality of media assets. The media assets may include, as an example only, downloaded resources (e.g., media assets and related content); videos; webcasts/webinars; questions asked (e.g., via the client application 106); and slides. As further described herein, a user profile, which may comprise the UIC, may include multiple entries 276 of words and/or phrases. An example of words and/or phrases that may be included in the multiple entries 276 is shown in the right-hand side of the visual representation 325 of the UIC. These words and/or phrases may represent interests of the corresponding user that are derived as described herein based on the user activity data 224.

Returning to FIG. 1, multiple source devices 150 can create digital content for presentation at a user device (e.g., one of the user devices 102). At least a subset of the source devices 150 can comprise a source platform. Such digital content can include, for example, static assets that can be retained in a media repository, as part of the media assets 166. The source device can provide the created digital content to a source gateway 146. The source device can be coupled to the source gateway by a network architecture 145. The network architecture 145 can include one or a combination of networks (wireless or wireline) that permit one-way and/or two-way communication of data and/or signaling. The source gateway 140 can send the digital content to the content management subsystem 140 for provisioning of the digital content in one or several of the media repositories 164.

In addition, or in some cases, a source device can configure the manner of creating digital content contemporaneously by means of the client application 106 and other components available to a user device. That is, the source device can build the client application 106 to have specific functionality for generation of digital content. The source device can then supply an executable version of the client device to a user device. Digital content created contemporaneously can be retained in the storage subsystem 144, for example.

The subsystems 136 also can include a service management subsystem 138 than can provide several administrative functionalities. For instance, the service management subsystem 138 can provide onboarding for new service providers. The service management subsystem 138 also can provide billing functionality for extant service providers. Further, the service management subsystem can host an executable version of the client application 106 for provision to a user device. In other words, the service management subsystem 136 can permit downloading the executable version of the client application 106.

With further reference to FIG. 2, the analytics subsystem 142 can retain user activity data 224 over time in an activity data repository 244 (referred to as activity data 244). The time during which the user activity data 224 can be retained can vary, ranging from a few days to several weeks.

The analytics subsystem 142 can include a report unit 260 that can generate various views of the activity data 244 and can operate on at least a subset of the activity data 244. The report unit 260 also can cause a user device to present a data view and/or one or several results from respective operations on the activity data 244. To that end, the user device can include the application 106 and the report unit 260 can receive from the application 106 a request message to provide the data view or the result(s), or both. Further, in response to the request message, the report unit 260 generate the data view and the result(s) and can then cause the application 106 to direct the user device to present a user interface conveying the data view or the result(s). The UI can be presented in a display device integrated into, or functionally coupled to, the user device. The user device can be one of the user devices 102 (FIG. 1).

The request message can be formatted according to one of several communication protocols (e.g., HTTP) and can control the number and type of data views and results to be presented in the user device. The request message can thus include payload data identifying a data view and/or a result being requested. In some cases, the request message can be general, where the payload data identify data view(s) and result(s) defined by the analytics subsystem. For instance, the payload data can be a string, such as "report_all" or "dashboard", or another alphanumeric code that conveys that a preset reporting option is being requested. In other cases, the request message can be customized, where the payload data can include one or more first codes identifying respective data views and/or one or more second codes identifying a particular operation on available activity data 244.

Figure 4:
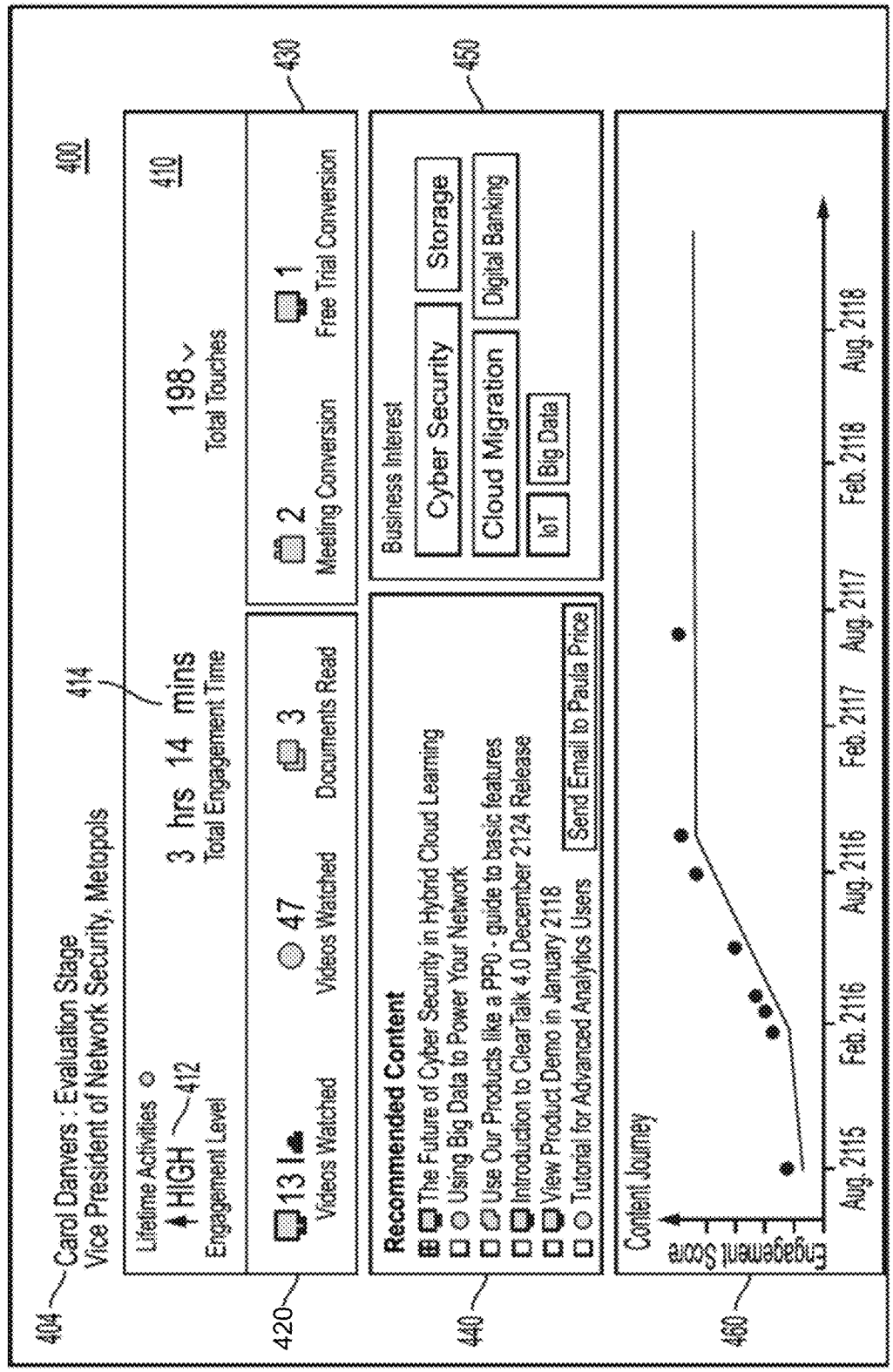
FIG. 4 illustrates an example of a user interface (UI) that presents various types of engagement data for a user device, in accordance with one or more embodiments of this disclosure.

FIG. 4 illustrates an example of a UI 400 that presents various types of engagement data that can be obtained from the activity data 244 for a particular end-user, in accordance with one or more embodiments of this disclosure. The UI 400 can be referred to as engagement dashboard. The data conveyed in the UI 400 can be obtained in response to a request message including the "dashboard" code or a similar payload data. As is illustrated in FIG. 4, the UI 400 includes indicia 404: various panes are displayed, each presenting a particular data view or an aggregated result for a particular end-user. Specifically, the UI 400 includes a first pane 410 that presents engagement level 412 and engagement time 414. The UI 400 also includes a second pane 420 that presents engagement activity and a third pane 430 that presents buying activity. In addition.

UI 400 includes a fourth pane 440 that presents a menu of content recommendations and a fifth pane 450 that presents at least some of the words/phrases 276 (FIG. 2) pertaining to the end-user. The words and phrases that are presented can be formatted in a way that pictorially ranks the interests of the end-user (e.g., greater font size represents greater interest). Further, the UI 400 also includes a sixth pane 460 that presents an amount of content consumed as a function of time. Such temporal dependence of content consumption can be referred to as "content journey". By making available the types of engagement data illustrated in the UI 400, a source device can access valuable and actionable insights to optimize a digital experience (or media asset).

The analytics subsystem 142 (FIG. 2) also can contain other scoring models besides the scoring model that can be applied to generate an interest level for particular content (e.g., a media asset). By using those other scoring models, the analytics subsystem 142 can generate information identifying features of a digital experience (or media asset(s)) that may cause satisfactory engagement (e.g., most engagement, second most engagement, or similar) with an end-user. Accordingly, the analytics subsystem 142 can predict how best to personalize digital experiences (or media assets) for particular customers based on their prior behavior and interactions with media assets supplied by the distribution platform devices 160 (FIG. 1). Accordingly, a source device can access valuable and actionable insights to optimize a digital experience.

More specifically, in some embodiments, the scoring unit 230 (FIG. 2) can apply a defined scoring model to user activity data 224 to evaluate a set of functionality features present in several media assets. Evaluating a functionality feature f includes generating a score S for f. Thus, for a set of multiple functionality features $\{f_0, f_1, f_2, \ldots, f_{N-1}\}$, with N a natural number greater than unity, application of defined scoring model can result in a set of respective scores $\{S_0, S_1, S_2, \ldots, S_{N-1}\}$. The defined scoring model can be one of the scoring models 248 and can be trained using historical user activity data for many users and media assets.

Simply for purposes of illustration, the functionality features can include (i) real-time translation; (ii) real-time transcription (e.g., captioning) in same language; (iii) real-time transcription in a different language; (iv) access to documents (scientific publications, scientific preprints, or whitepapers, for example) mentioned in a presentation; (v) detection of haptic capable device and provisioning of 4D experience during presentation; (vi) "share" function to custom set of recipients within or outside a social network; (vii) access to recommended content, such as copies of or links to similar presentations and/or links to curated content (e.g., "because you watched "Content A" you might enjoy "Content B"); (viii) messaging with links to cited, recommended, or curated content; (ix) scheduler function that prompts to add, adds, or sends invites for, live presentations of interest that occur during times that end-user is free; automatically populates a portion of the calendar with those presentations, amount of calendar that can be populated is determined by end-user; or similar functions. Access to a document can include provision of a copy of the document or provision of a link to the document. Similarly, access to content can include provision of a copy of the content or provision of a link to the content.

Figure 5:
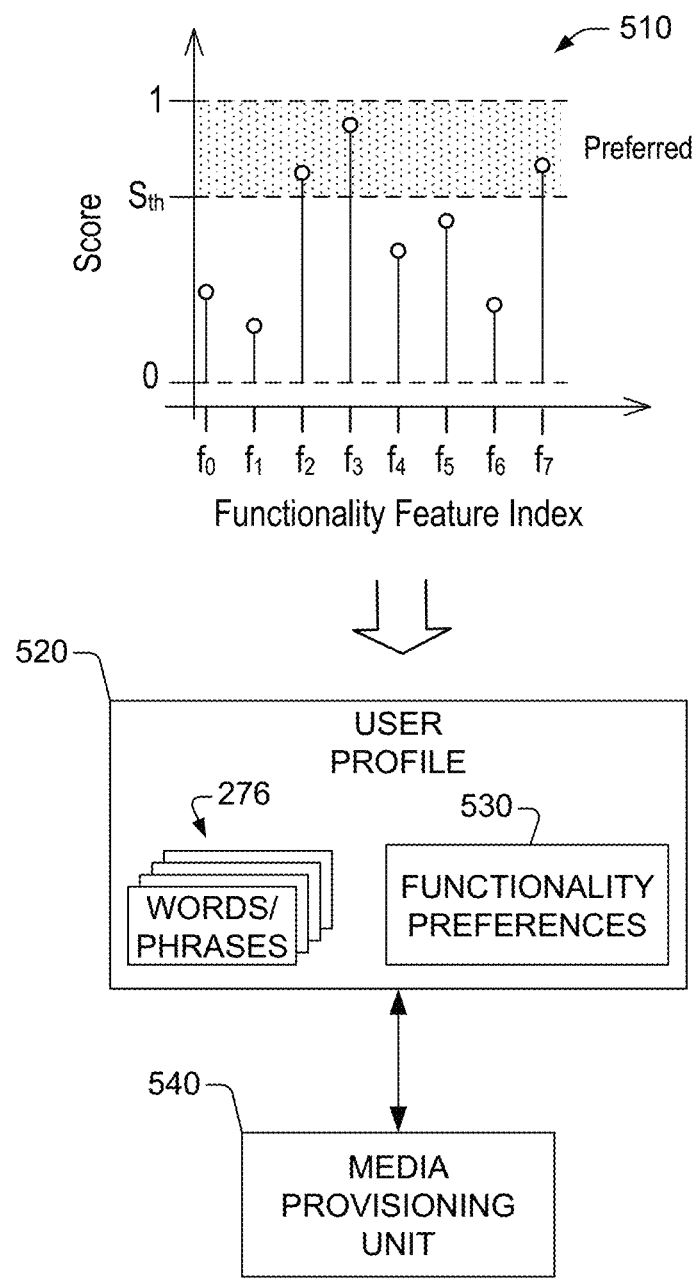
FIG. 5 schematically depicts engagement scores for example functionality features available per digital experience (or media asset), for a particular end-user, in accordance with one or more embodiments of this disclosure.

Diagram 510 in FIG. 5 schematically depicts engagement scores for an example case in which N=8 functionality features are available per digital experience (or media asset), for a particular end-user. Each of the features $f_0, f_1, f_2, f_3, f_4, f_5, f_6$, and $f_7$ have respective scores. Some of the scores are less than a threshold score $S_{th}$ and other scores are greater than $S_{th}$. The threshold score is a configurable parameter that the profile generation unit 250 (FIG. 2) can apply to determine if a functionality feature is preferred by the particular end-user. As is depicted with a dotted area in FIG. 5, a functionality feature f is preferred if the corresponding engagement score S is greater than or equal to $S_{th}$. The score structure for that set of functionality features can differ from end-user to end-user, thus revealing which functionality features are preferred for the end-user. The profile generation unit 250 can determine that respective engagement scores for one or several functionality features are greater than $S_{th}$. In response, the profile generation unit 250 can update a user profile 520 with preference data identifying the functionality feature(s). Thus, the user profile 520 can include words/phrases 276 and functionality preference 530 including that preference data.

In the example depicted in FIG. 5, functionality features $f_2$, $f_3$ and $f_7$ have engagement scores greater than $S_{th}$. Thus, the profile generation unit 250 (FIG. 2) can determine that those features are preferred by the particular end-user. In one example, $f_2$ can be real-time translation, $f_3$ can be real-time transcription in a different language from the language of a presentation, and $f_7$ can be access to documents. The profile generation unit 250 can determine that respective engagement scores for those features are greater than $S_{th}$, and can then update a user profile 520 with preference data identifying features functionality features $f_2$, $f_3$ and $f_7$. As such, the user profile 520 can include words/phrases 276 and functionality preference 530 including that preference data.

The content management subsystem 140 can personalize the digital experiences for an end-user by including the functionality features 530 defined in the user profile 520 pertaining to the end-user. In some embodiments, the content management subsystem 140 can include a media provisioning unit 540 that access the functionality preferences 530 and can then generate a UI that is personalized according to the functionality preferences 530. That personalized UI can include the functionality features identified in the functionality preferences 530.

In addition, or in other embodiments, the media provisioning unit 540 also can generate a layout of content areas that is personalized to end-user. The personalized layout can include a particular arrangement of one or several UI elements for respective preferred functionalities of the end-user. Further, or in other embodiments, the media provisioning unit 540 can generate a presentation ticker (such as a carousel containing indicia) identifying live-action presentations near a location of a user device presenting the personalized UI. In addition, or in some cases, the presentation ticker also can include indicia identifying digital experiences (or media assets) that occur during times shown as available in a calendar application of the end-user.

It is noted that the analytics subsystem 142 is not limited to scoring models. Indeed, the analytics subsystem 142 can include and utilize other machine-learning (ML) models to provide various types of predictive functionalities. Examples of those functionalities include predictive engagement levels for end-users; Q&A autonomous modules to answer routine support questions; and platform audience and presenter load predictions. The service management subsystem 138 (FIG. 1) can use load predictions to identify and configure operational resources and provide oversight. The operational resources include computing resources, such as processing units, storage units, and cloud services, for example.

Figure 6:
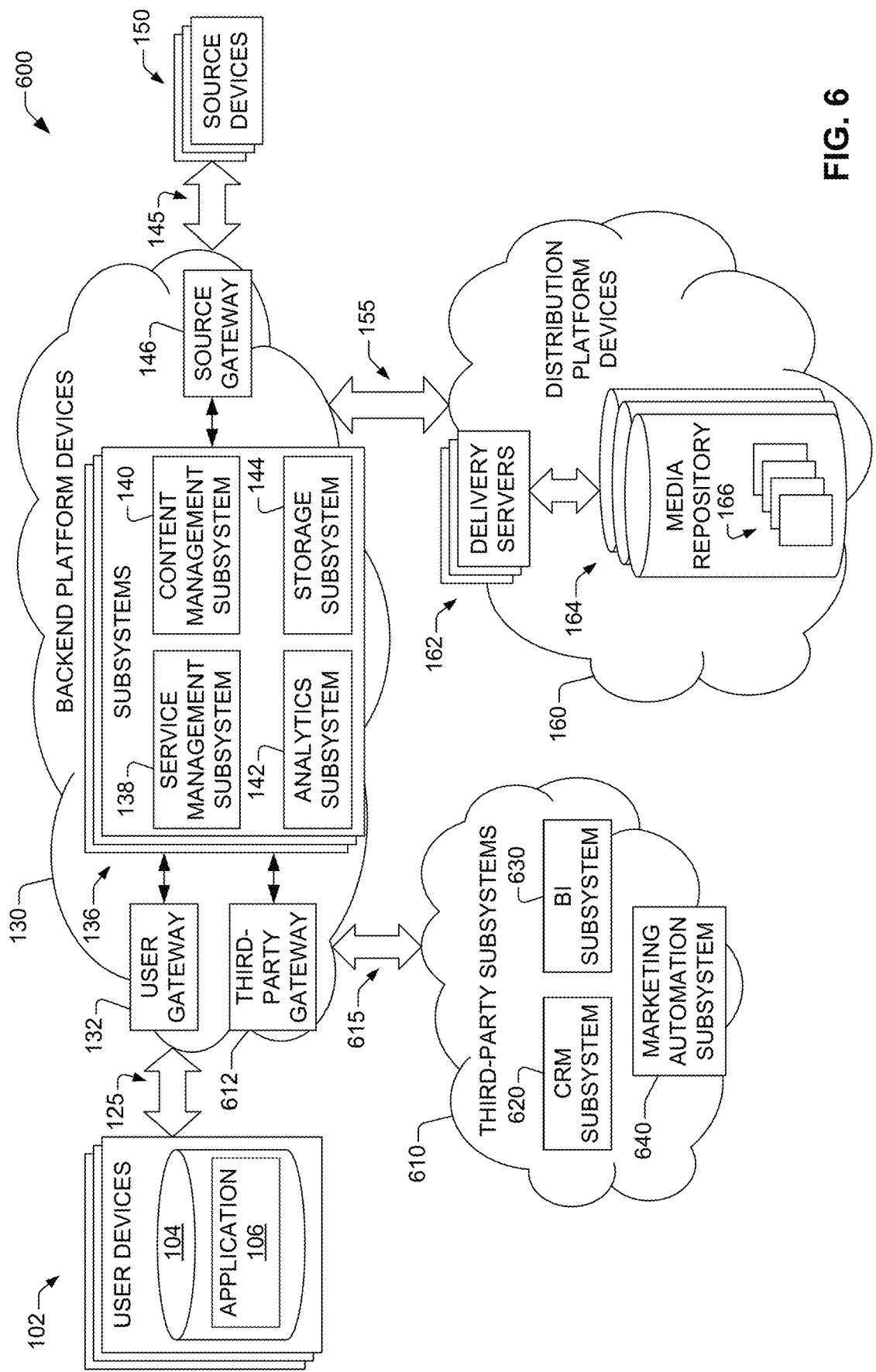
FIG. 6 illustrates an example of an operational environment that includes integration with third-party subsystems, in accordance with one or more embodiments of this disclosure.

The presentation platform described in this disclosure can be integrated with a third-party platform. FIG. 6 illustrates an example of an operational environment 600 that includes a presentation platform integrated with third-party subsystems 610, in accordance with one or more embodiments of this disclosure. Integration of the presentation platform can be accomplished by functional coupling with third-party subsystems 610 via a third-party gateway 612 and a network architecture 615. The network architecture 615 can include one or a combination of networks (wireless or wireline) that permit one-way and/or two-way communication of data and/or signaling.

The third-party subsystem 610 can include various type of subsystems that permit first-person insights generated by the analytics subsystem 142 to be extracted and leveraged across business systems of a source platform. As is illustrated in FIG. 6, the third-party subsystems 610 can include a Customer Relationship Management (CRM) subsystem 620, a business intelligence (BI) subsystem 630, and a marketing automation subsystem 640. Each third-party subsystem 610 may be referred to herein as a "client system" or simply as a "client". The presentation platform described herein may access, control, etc., each of the third-party subsystems 610.

Figure 7A:
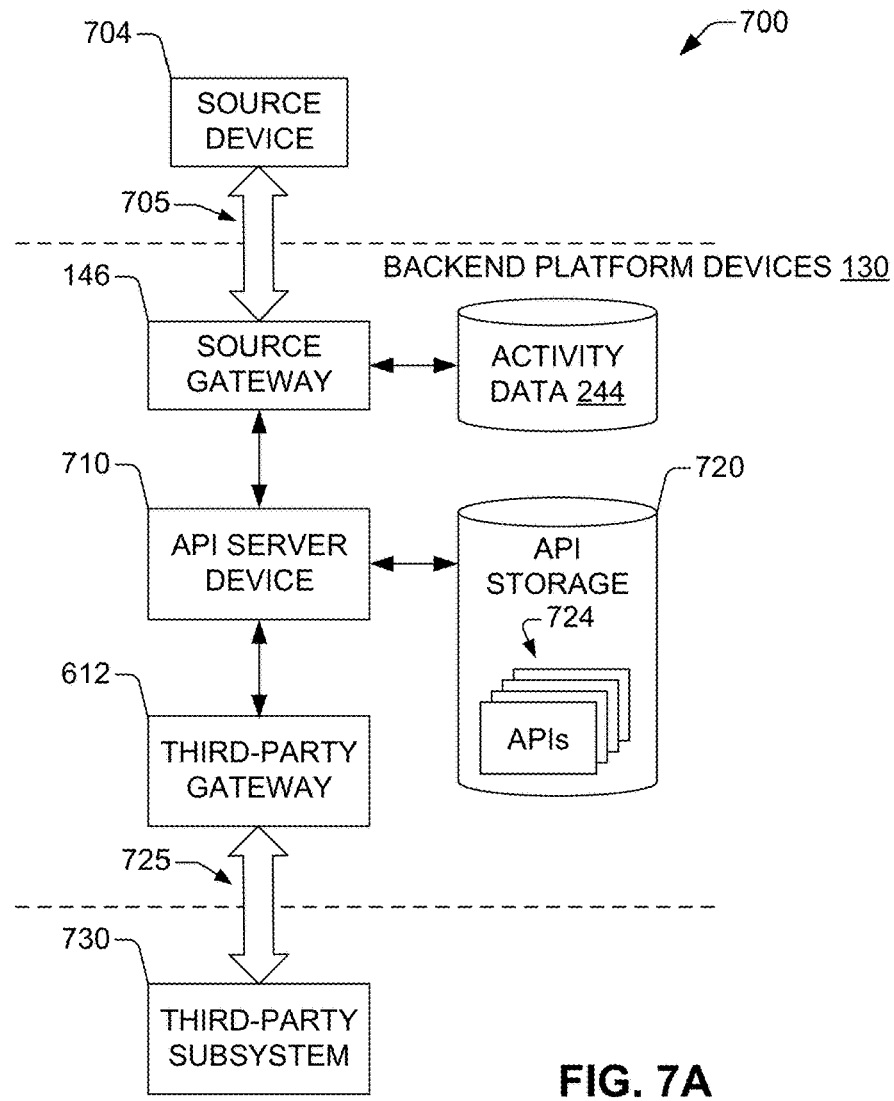
FIG. 7A illustrates another example of an operational environment for integration with a third-party subsystem, in accordance with one or more embodiments of this disclosure.

As is illustrated in FIG. 7, a source device 704 can access an API server device 710 within the backend platform device 130 (FIG. 1 or FIG. 4) by means of the source gateway 146. The API server device 710 can expose multiple application programming interfaces (APIs) 724 retained in API storage 720. One or many of the APIs 724 can be exposed to the source device 704, in order to access a third-party subsystem 730 and functionality provided by such subsystem. The exposed API(s) can permit executing respective sets of function calls. That is, a first exposed API can permit accessing a first group of function calls for defined functionality, and a second exposed API can permit accessing a second group of function calls for defined second functionality. The function calls can operate on data that is contained in the soured device 704 and/or a storage system functionally coupled to the source device 704. The function calls also can operate on activity data 244, with result being pushed to the source device 704.

Data and/or signaling associated with execution of such function calls can be exchanged between the API server device 710 and the third-party subsystem 730 via a third-party gateway 612. In addition, other data and/or signaling can be exchanged between the API server device 710 and the source device 704 via the source gateway 146.

In some cases, the API server device 710 also can expose one or many of the APIs 726 to the third-party subsystem 730. In that way, the third-party subsystem 730 (or, in some cases, a third-party device, such as a developer device) can create applications that utilize some of the functionality of the backend platform devices 130.

Figure 7B:
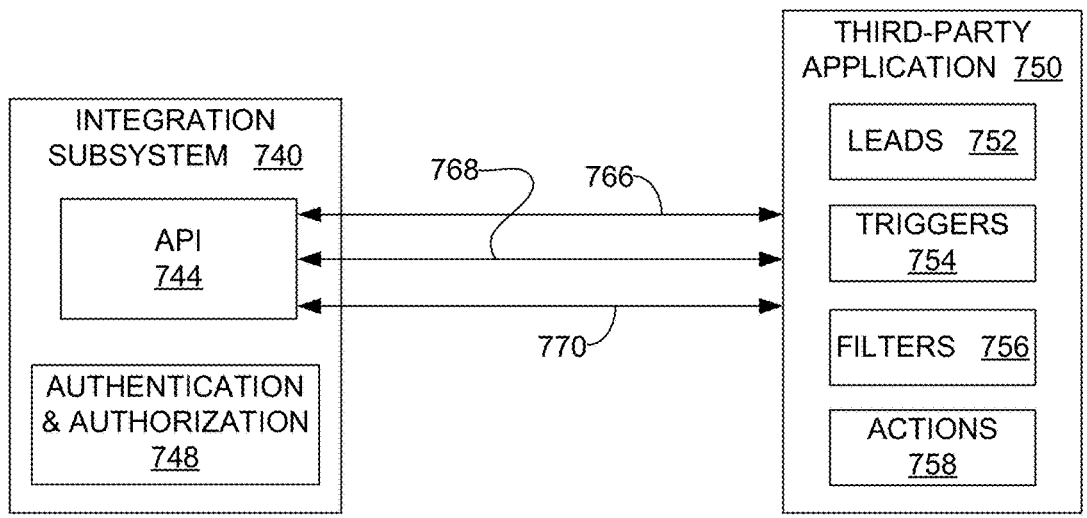
FIG. 7B illustrates example components of an integration subsystem, in accordance with one or more embodiments of this disclosure.

FIG. 7B illustrates example components of the integration subsystem 740. The integration subsystem 740 supports an ecosystem of third-party application integrations and APIs that enable the first-person insights generated by the analytics subsystem 142 to be extracted and leveraged across customer business systems for more intelligent sales and marketing. The integration subsystem 740 can include an API 744 that may be configured to exchange data with one or more third-party applications 750. The one or more third-party applications 750 may be, for example, a sales application, a marketing automation application, a CRM application, a Business Intelligence (BI) application, and/or the like. The third-party applications 750 may be configured to leverage data received from and/or sent to the integration subsystem 740, via the API 744.

In order to exchange data and provide control over certain functionality via the API 744, the integration subsystem 744 may use an authentication and authorization unit 748 to generate an access token. The access token may comprise a token key and a token secret. The access token may be associated with a client identifier. Authentication for API requests may be handled via custom HTTP request headers corresponding to the token key and the token secret. The client identifier may be included in the path of an API request URL.

The API 744 may comprise a set of routines, protocols, and/or tools for building software applications. The API 744 may specify how software components should interact. In an embodiment, the API 744 may be configured to send data 766, receive data 768, and/or synchronize data 770. In some cases, the API 744 may be configured to send data 766, receive data 768, and/or synchronize data 770 in substantially real-time, at regular intervals, as requested, and/or the like. The API 744 may be configured to provide the one or more third-party applications 750 the ability to access a digital experience (or media asset) functionality, including, for example, event management (e.g., create a webinar, delete a webinar), analytics, account level functions (e.g., event, registrants, attendees), event level functions (e.g., metadata, usage, registrants, attendees), and/or registration (e.g., webinar, or an online portal product as is described below).

The integration subsystem 740, via the API 744, may be configured to deliver attendance/registration information to the third-party application 750 to update contact information for Leads 752. The third-party application 750 can use attendance/registration information for lead segmentation, lead scoring, lead qualification, and/or targeted campaigns. Engagement data (such as viewing duration, engagement scores, resource downloads, poll/survey responses) associated with webinars may be provided to the third-party application 750 for use in lead scoring and lead qualification to identify leads and ensure effective communication with prospects and current customers.

The integration subsystem 740, via the API 744, may be configured to enable the third-party application 750 to use data provided by the integration subsystem 740, via the API 744, to automate workflows. Engagement data (such as viewing duration, engagement scores, resource downloads, poll/survey responses) associated with webinars may be provided to the third-party application 750 for use in setting one or more triggers 754, filters 756, and/or actions 758. The third-party application 750 may configure a trigger 754. The trigger 754 may be a data point and/or an event, the existence of which may cause an action 758 to occur. The third-party application 750 may configure a filter 754. The filter 754 may be a threshold or similar constraint applied to the data point and/or the event to determine whether any action 758 should be taken based on occurrence of the trigger 758 or determine which action 758 to take based on occurrence of the trigger 756. The third-party application 750 may configure an action 758. The action 758 may be an execution of a function, such as updating a database, sending an email, activating a campaign, etc. The third-party application 750 may receive data (such as engagement data) from the integration subsystem 740, via the API 744, determine if the data relates to a trigger 754, apply any filters 756, and initiate any actions 758. As an example, the third-party application 750 may receive engagement data from the integration subsystem 740 that indicates a user from a specific company watched 30 minutes of a 40-minute video. A trigger 754 may be configured to identify any engagement data associated with the specific company. A filter 756 may be configured to filter out any engagement data associated with viewing times of less than 50% of a video. An action 758 may be configured to send an e-mail to the user inviting the user to watch a related video.

In some embodiments, the content management subsystem 140 (FIG. 1) can provide an online resource portal product that permits providing rich digital experiences for an audience of prospective end-user to find, consume, and engage with interactive webinar experiences and other media assets, such as videos and whitepapers. The online resource portal product can be referred to as an "engagement hub", simply for the sake of nomenclature.

Figure 8:
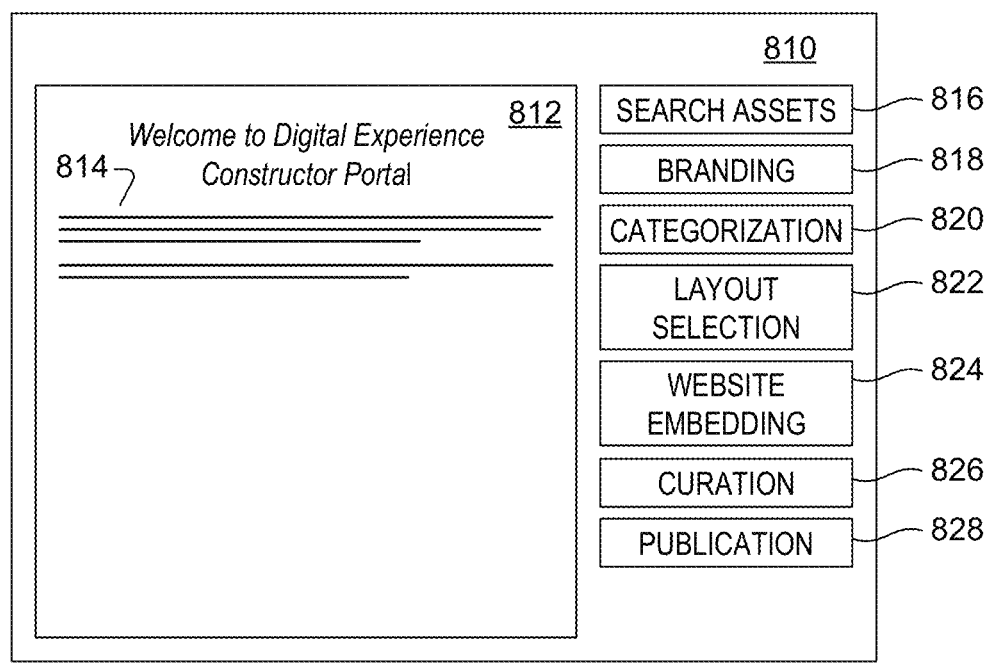
FIG. 8 illustrates an example of a UI representing a landing page for configuration of aspects of a digital experience, in accordance with one or more embodiments of this disclosure.
Figure 9:
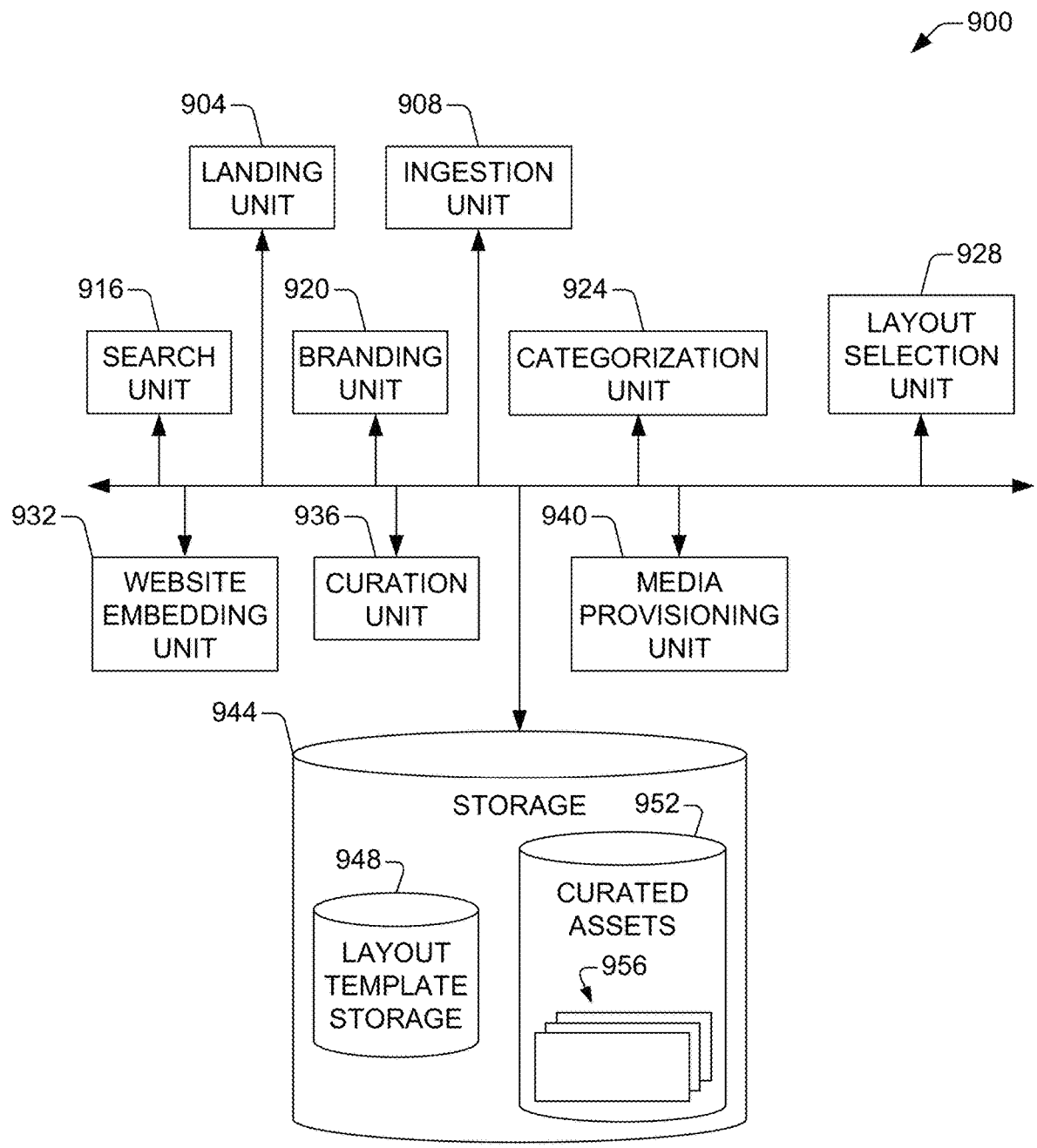
FIG. 9 illustrates an example of a subsystem for configuration of aspects of a digital experience, in accordance with one or more embodiments of this disclosure.

The online portal product provides various functionalities to generate a digital experience (or media asset). As an illustration, FIG. 8 presents an example of a UI 810 representing a landing page of the online portal product, and FIG. 9 illustrates an example of a portal subsystem 900 that provides the functionality of the online portal product. As is illustrated in FIG. 8, the landing page include a pane 812 that includes a title and a UI element 814 that includes digital content describing the functionality of the online portal product. The title is depicted as "Welcome to Digital Experience Constructor Portal", simply as an example. A landing unit 904 in the portal subsystem 900 (FIG. 9) can cause the presentation of the UI 900 in response to receiving a request message to access the online portal product from a source device.

The UI 810 (FIG. 8) also includes several selectable UI elements identifying respective examples of the functionalities that can be provided by the online portal product. Specifically, the selectable UI elements include, for example, a selectable UI element 816 corresponding to a search function; a selectable UI element 818 corresponding to a branding function; a selectable UI element 820 corresponding to a categorization function; a selectable UI element 822 corresponding to a layout selection function (from defined content layouts), a website embedding function, a curation function, and a provisioning function. The provisioning function also can be referred to a publication function.

Selection of the selectable UI element 816 can cause the source device that presents the UI 810 to present another UI (not depicted) to search for a media asset to be augmented with directed content. To that end, in some embodiments, the portal subsystem 900 can include a search unit 916. In this disclosure, directed content refers to digital media configured for a particular audience, or a particular outlet channel (such as a website, a streaming service, or a mobile application), or both. Directed content can include, for example, digital media of various types, such as advertisement; surveys or other types of questionnaires; motion pictures, animations, or other types of video segments; podcasts; audio segments of defined durations (e.g., a portion of a speech or tutorial; and similar media.

Selection of the selectable UI element 818 can cause the source device to present another UI (not depicted) that permits obtaining digital content to incorporate into a particular media asset. The digital content can identify the particular media asset as pertaining to a source platform that includes the source device. In some cases, the digital content can be embodied in as a still image (e.g., a logotype), an audio segment (e.g., a jingle), or an animation. In some embodiments, the portal subsystem 900 can include a branding unit 920 that can direct the source device to present a UI in response to selection of the selectable UI element 818. The portal subsystem 900 also can include an ingestion unit 908 that can obtain the digital content from the storage subsystem 144 (FIG. 1) for example.

Selection of the selectable UI element 820 can cause the source device to present another UI (not depicted) to categorize multiple media assets according to multiple categories. In some embodiments, the portal subsystem 900 can include a categorization unit 924 that can cause presentation of the other UI in response to selection of the selectable UI element 820. The categorization unit 924 also can classify a media asset according to one of the several categories.

Selection of the selectable UI element 822 can cause the source device to present another UI (not depicted) to select a layout of areas for presentation of digital content. A first area of the layout of areas can be assigned for presentation of a media asset that is being augmented with directed content. At least one second area of the layout of areas can be assigned for presentation of the directed content. In some embodiments, the portal subsystem 900 can include a layout selection unit 928 that can cause presentation of the other UI in response to selection of the selectable UI element 822. The layout selection unit 928 can cause presentation of a menu of defined layout templates. Data defining such a menu can be retained in a layout template storage 948. In response to receiving input information identifying a selection of the particular defined layout template, the layout selection unit 928 can configure that particular defined layout for presentation of the media asset and directed content.

Figure 10:
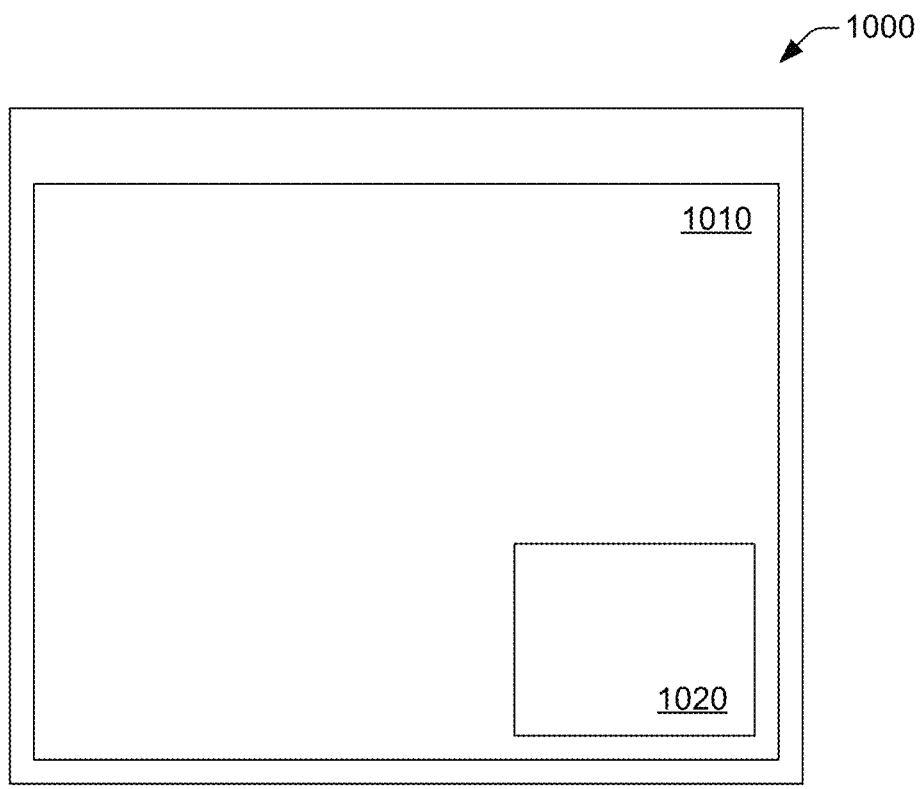
FIG. 10 illustrates a schematic example of a layout template for presentation of a media asset and directed content, in accordance with one or more embodiments of this disclosure.
Figure 11:
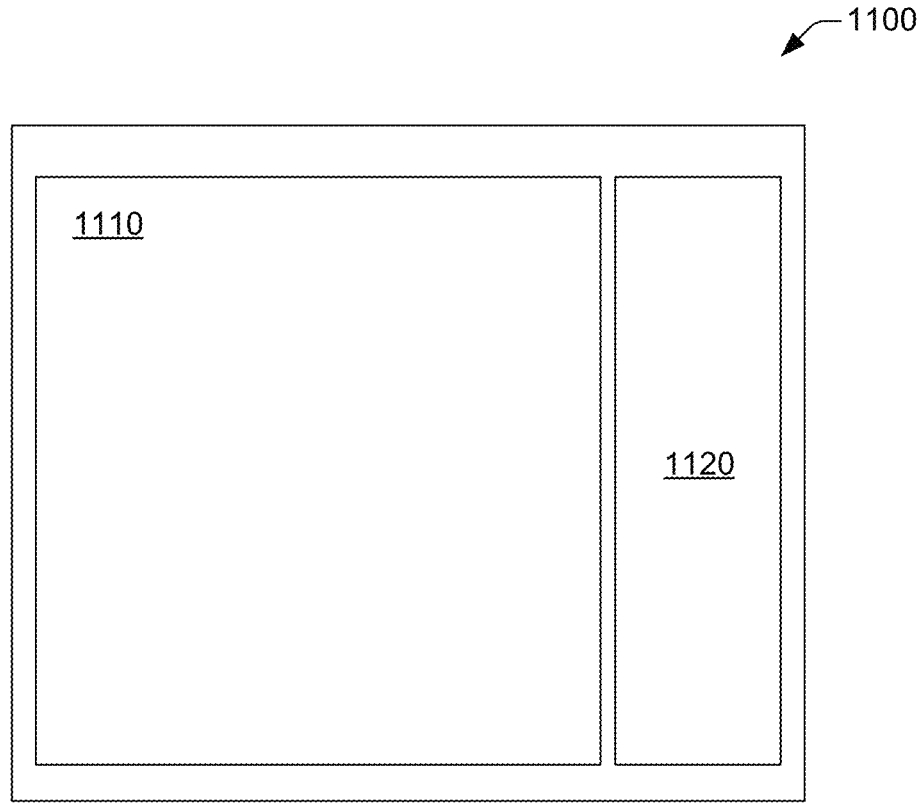
FIG. 11 illustrates another schematic example of a layout template for presentation of a media asset and directed content, in accordance with one or more embodiments of this disclosure.

FIG. 10 and FIG. 11 illustrate respective examples of layout templates. In FIG. 10, an example layout template 1000 includes a first area 1010 that can be allocated to the media asset and a second area 1020 that can be allocated to the directed content. As is shown in FIG. 10, the directed content can be overlaid on the media asset. In FIG. 11, an example layout template 1100 includes a first area 1110 that can be allocated to the media asset and a second area 1120 that can be allocated to the directed content. The second area 1120 is adjacent to first area 1110. Thus, rather than presenting the directed content as an overlay, the directed content is presented adjacent to the media asset.

With further reference to FIG. 8, selection of the selectable UI element 824 can cause the source device that presents the UI 810 to present another UI (not depicted) to configure website-embedding of directed content. To that end, in some embodiments, the portal subsystem 900 can include a website embedding unit 932.

Selection of the selectable UI element 826 can cause the source device to present another UI (not depicted) to curate directed content that can be presented in conjunction with media assets. In some embodiments, the ingestion unit 908 can obtain multiple directed content assets and can cause the source device to present such assets. The multiple directed content assets can be presented in various formats. In one example, the multiple directed content assets can be presented as respective thumbnails. In another example, the multiple directed content assets can be presented in a selectable carousel area. The portal subsystem 900 also can include a curation unit 936 that cause presentation of the other UI in response to selection of the selectable UI element 826. In addition, in some cases, the curation unit 936 can receive input information indicating approval of one or several directed content assets for presentation with media assets. In other cases, the curation unit 936 can evaluate each one the multiple directed content assets obtained by the ingestion component 908. An evaluation that satisfies one or more defined criteria results in the directed content asset being approved for presentation with media assets.

Regardless of approval mechanism, the curation unit 936 can then configure each one of the approved directed content asset(s) as being available for presentation. The approval and configuration represent the curation of those assets. The curation unit 936 can update a corpus of curated directed content assets 956 within a curated asset storage 952 in response to curation of one or many directed content assets.

The portal subsystem 900 also can include a media provisioning unit 940 that can configure presentation of a media asset based on one or a combination of the selected digital content that identifies the source platform, one or several curated directed content assets, and a selected defined layout. To that end, in some cases, the media provisioning unit 940 can generate formatting information identifying the media asset, the selected digital content, the curated directed content asset(s), and the selected defined layout. In addition, or in other cases, the media provisioning unit 940 also can configure a group of rules that controls presentation of directed content during the presentation of the media asset. As an example, the media provisioning unit 940 can define a rule that dictates an instant in which the presentation of the directed content begins and a duration of that presentation. Further, or as another example, the media provisioning unit 940 can configure another rule that dictates a condition for presentation of the directed content and a duration of the presentation of the directed content. Examples of the condition include presence of a defined keyword or keyphrase, or both, in the media asset; presence of defined attributes of an audience consuming the media asset; or similar conditions. An attribute of an audience includes, for example, location of the audience, size of the audience, type of the audience (e.g., students or C-suite executives, for example), or level of engagement of the audience. In some embodiments, an autonomous component (referred to as bot) can listen to a presentation and can perform keyword spotting or more complete speech recognition to detect defined keywords or keyphrases.

The media provisioning unit 940 can integrate the formatting information into the media asset as metadata. The metadata can control some aspects of the digital experience that includes the presentation of the media asset. As a result, the online portal product provides a straightforward and efficient way for a source device to seamlessly publish, curate, and promote their interactive webinar experiences alongside directed content that a source device can upload and host inside presentation platform described herein in connection with FIG. 1 or FIG. 4, or both.

Figure 12:
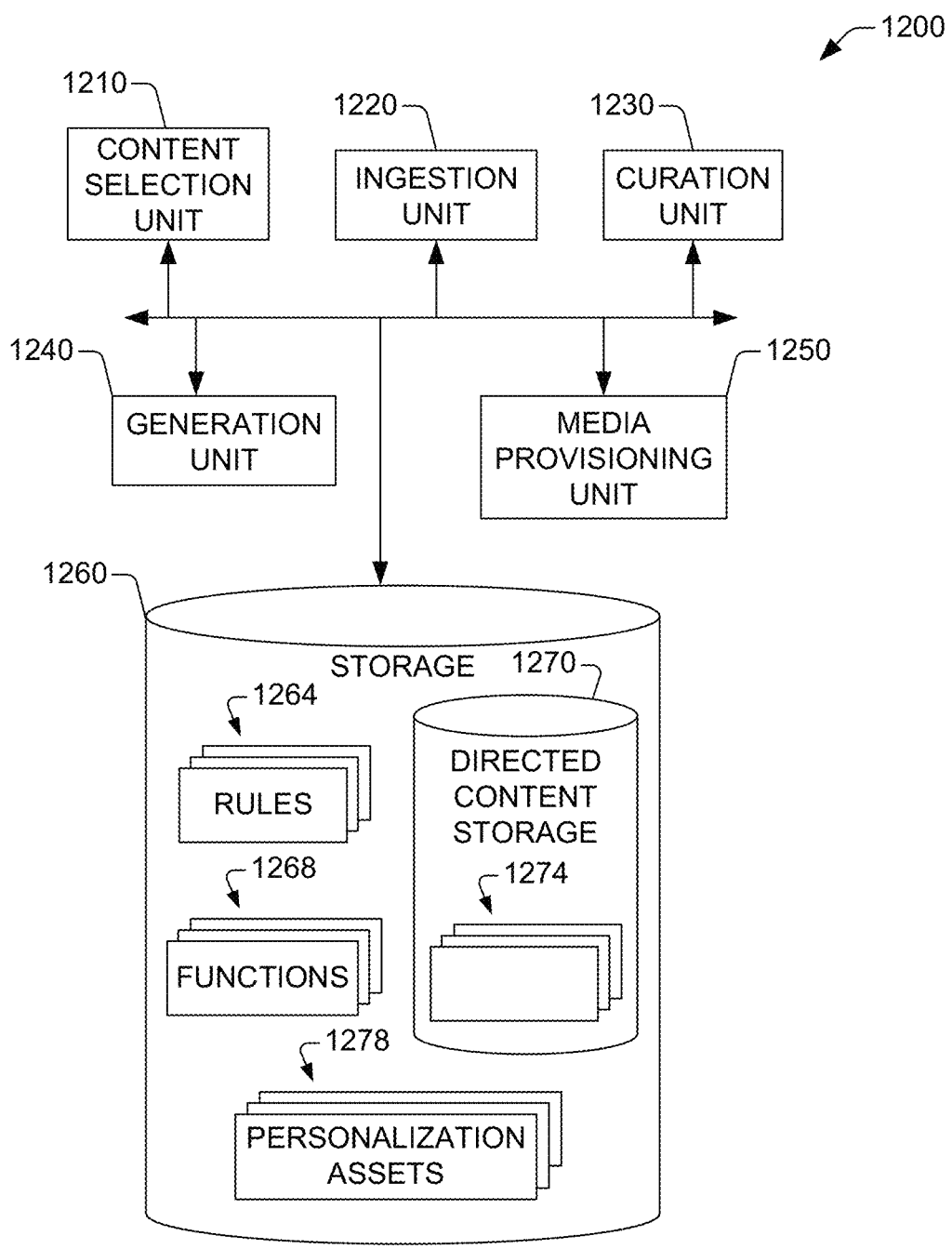
FIG. 12 illustrates an example of a personalization subsystem in a presentation platform for presentation of digital content, in accordance with one or more embodiments of this disclosure.

Besides the online portal product, or in some embodiments, the content management subsystem 130 can include a personalization subsystem 1200 as is illustrated in FIG. 12. The personalization subsystem 1200 can be a part of the content management subsystem 140 and can permit creating a personalized media asset that incorporates directed content. The personalization subsystem 1200 can permit, for example, generating, curating, and/or disseminating interactive webinar and video experiences and other multimedia content to distributed audience segments with relevant messaging, offers, and calls-to-action (e.g., view video, listen to podcast, signup for newsletter, attend a tradeshow, etc.).

The personalization subsystem 1200 can include a directed content selection unit 1210 that can identify directed content assets that can be relevant to a user device consuming a media asset. To that end, the content selection unit 1210 can direct an ingestion unit 1220 to obtain a group of directed content assets from directed content storage 1280 retaining a corpus of directed content assets 1284. In some cases, the corpus of directed content assets 1264 can be categorized according to attributes of an end-user. The attributes can include, for example, market type, market segment, geography, business size, business type, revenue, profits, and similar. Accordingly, for a particular user device for which the personalization is being implemented, the content selection unit 1210 can direct the ingestions unit 1220 to obtain directed content assets having a particular set of attributes. Simply as an illustration, the ingestion unit 1220 can obtain multiple directed content assets having the following attributes: industrial equipment, small-medium business (SMB), and U.S. Midwest.

In some cases, the ingestion unit 1220 can cause a source device to present the multiple directed content assets according to one of various formats. As mentioned, the multiple directed content assets can be presented as respective thumbnails or in a selectable carousel area.

The personalization subsystem 1200 also can include a curation unit 1230 that can receive input information indicating approval of one or several directed content assets for presentation with media assets. The input information can be received from the source device that personalizes the media asset. In other cases, the curation unit 1230 can evaluate each one the multiple directed content assets obtained by the ingestion unit 1220. An evaluation that satisfies one or more defined criteria results in the directed content asset being approved for presentation with media assets.

Regardless of approval mechanism, the curation unit 936 can then configure each one of the approved directed content asset(s) as being available for personalization. As mentioned, the approval and configuration represent the curation of those assets. The ingestion unit 1220 can update a corpus of personalization assets 1278 to include directed content assets that have been curated for a particular user-device. within a storage 1260.

The personalization subsystem 1200 also can include a generation unit 1240 that can select one or several personalization assets of the personalization assets 1278 and can then incorporate the personalization asset(s) into a media asset being personalized. Incorporation of a personalization asset into the media asset can include, in some cases, adding one or several overlays to the media asset. A first overlay can include notes on a product described in the media asset. The overlay can be present for a defined duration that can be less than or equal to the duration of the media asset. Simply as an illustration, for industrial equipment, the note can be a description of capacity of a mining sifter or stability features of vibrating motor. A second overlay can include one or several links to respective documents (e.g., product whitepaper) related to the product. Further, or as another alternative, a third overlay can include a call-to-action related to the product.

Further, or in some cases, the generation unit 1240 can configure one or several functionality features to be made available during presentation of the media asset. Examples of the functionality features include translation, transcription, read-aloud, live chat, trainer/presenter scheduler, or similar. The type and number of functionality features that are configured can be based on the respective scores as is described above.

The generation unit 1240 can generate formatting information defining presentation attributes of one or several overlays to be included in the media asset being personalized. In addition, or in some cases, the generation unit 1240 also can generate second formatting information identifying the group of functionality features to be included with the media asset.

The media provisioning unit 940 can integrate available formatting information into the media asset as metadata. The metadata can control some aspects of the personalized digital experience that includes the presentation of the media asset. The media provisioning unit 1260, in some cases, also can configure one or more platforms/channels (web, mobile web, mobile app) to present the media asset. In addition, or in other cases, the media provisioning unit 1250 also can configure a group of rules that controls presentation of the media asset. As an example, the media provisioning unit 940 can define a rule that dictates that directed content is presented during specific time intervals during certain days. Further, or as another example, the media provisioning unit 1250 can configure another rule that dictates that directed content is presented during a particular period. For example, the particular period can be a defined number of days after initial consumption of the media asset. As yet another example, the media provisioning unit 1250 can define yet another rule that dictates that directed content is presented a defined number of times during a particular period.

Figure 13A:
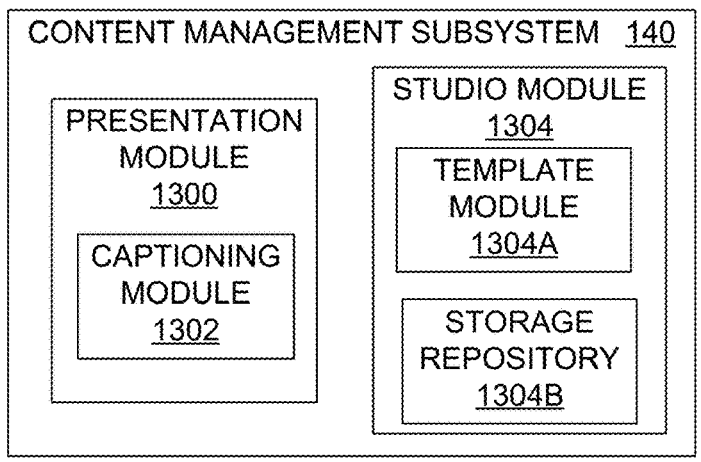
FIG. 13A illustrates example components of a content management subsystem, in accordance with one or more embodiments of this disclosure.

FIG. 13A shows example components of the content management subsystem 140. Digital content (e.g., the media assets 166) as described herein may be provided by a presentation module 1300 of the content management subsystem 140. For example, the media assets 166 may comprise interactive webinars. The webinars may comprise web-based presentations, livestreams, webcasts, etc. The phrases "webinar" and "communication session" may be used interchangeably herein. A communication session may comprise an entire webinar or a portion (e.g., component) of a webinar, such as a corresponding chat room/box. The presentation module 1300 may provide webinars at the user devices 102 via the client application 106. As further described herein, the webinars may be provided via a user interface(s) 1301 of the client application 106.

The webinars may comprise linear content (e.g., live, real-time content) and/or on-demand content (e.g., prerecorded content). For example, the webinars may be livestreamed. As another example, the webinars may have been previously livestreamed and recorded. Previously recorded webinars may be stored in the media repository 164 and accessible on-demand via the client application 106. As further described herein, a plurality of controls provided via the client application 106 may allow users of the user devices 102 to pause, fast-forward, and/or rewind previously recorded webinars that are accessed/consumed on-demand.

As shown in FIG. 13A, the content management subsystem 140 may comprise a studio module 1304. The studio module 1304 may comprise a production environment (not shown). The production environment may comprise a plurality of tools that administrators and/or presenters of a webinar may use to record, livestream, and/or upload multimedia presentations/content for the webinar.

The studio module 1304 may comprise a template module 1304A. The template module 1304A may be used to customize the user experience for a webinar using a plurality of stored templates (e.g., layout templates). For example, administrators and/or presenters of a webinar may use the template module 1304A to select a template from the plurality of stored templates for the webinar. The stored templates may comprise various configurations of user interface elements, as further described below with respect to FIG. 13B. For example, each template of the plurality of stored templates may comprise a particular background, font, font size, color scheme, theme, pattern, a combination thereof, and/or the like. The studio module 1304 may comprise a storage repository 1304B that allows any customization and/or selection made within the studio module 1304 to be saved (e.g., as a template).

Figure 13B:
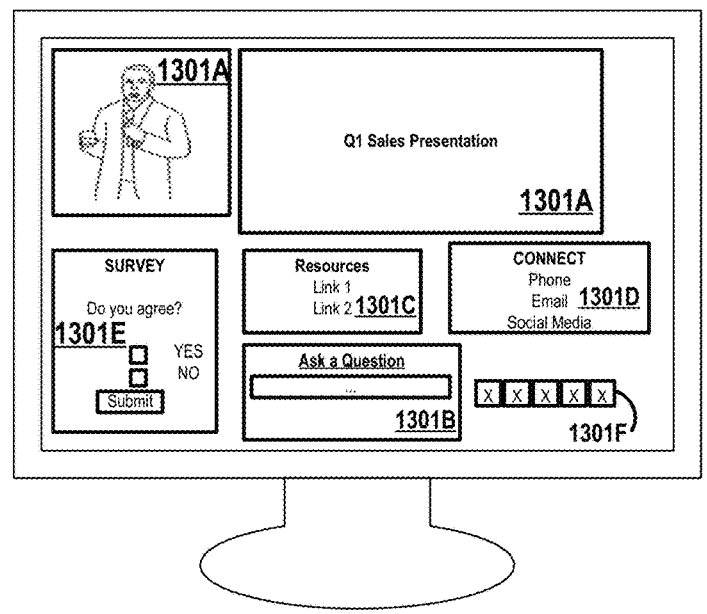
FIG. 13B illustrates an example of a digital experience, in accordance with one or more embodiments of this disclosure.

FIG. 13B shows an example of a user interface 1301 of an example webinar. The user interface 1301 may be generated by the presentation module 1300 and presented at the user devices 102 via the client application 106. The user interface 1301 for a particular webinar may comprise a background, font, font size, color scheme, theme, pattern, a combination thereof, and/or the like. The user interface 1301 may comprise a plurality of interface elements (e.g., "widgets") 1301A-1301F. The user interface 1301 and the plurality of interface elements 1301A-1301F may be configured for use on any computing device, mobile device, media player, etc. that supports rich web/Internet applications (e.g., HTML5, Adobe Flash™, Microsoft Silverlight™, etc.).

As shown in FIG. 13B, the user interface 1301 may comprise a media player element 1301A. The media player element 1301A may stream audio and/or video presented during a webinar. The media player element 1301A may comprise a plurality of controls (not shown) that allow users of the client application 106 to adjust a volume level, adjust a quality level (e.g., a bitrate), and/or adjust a window size. For webinars that are provided on-demand, the plurality of controls of the media player element 1301A may allow users of the client application 106 to pause, fast-forward, and/or rewind content presented via the media player element 1301A.

As another example, as shown in FIG. 13B, the user interface 1301 may comprise a Q&A element 1301B. The Q&A element 1301B may comprise a chat room/box that allows users of the client application 106 to interact with other users, administrators, and/or presenters of the webinar. The user interface 1301 may also comprise a resources element 1301C. The resources element 1301C may include a plurality of internal or external links to related content associated with the webinar, such as other webinars, videos, audio, images, documents, websites, a combination thereof, and/or the like.

The user interface 1301 may comprise a communication element 1301D. The communication element 1301D may allow users of the client application 106 to communicate with an entity associated with the webinar (e.g., a company, person, website, etc.). For example, the communication element 1301D may include links to email addresses, websites, telephone numbers, a combination thereof, and/or the like.

The user interface 1301 may comprise a survey/polling element 1301E. The survey/polling element 1301E may comprise a plurality of surveys and/or polls of various forms. The surveys and/or polls may allow users of the client application 106 to submit votes, provide feedback, interact with administrators and/or presenters (e.g., for a live webinar), interact with the entity associated with the webinar (e.g., a company, person, website, etc.), a combination thereof, and/or the like.

The user interface 1301 may comprise a plurality of customization elements 1301F. The plurality of customization elements 1301F may be associated with one or more customizable elements of the webinar, such as backgrounds, fonts, font sizes, color schemes, themes, patterns, combinations thereof, and/or the like. For example, the plurality of customization elements 1301F may allow the webinar to be customized via the studio module 1304. The plurality of customization elements 1301F may be customized to enhance user interaction with any of the plurality of interface elements (e.g., "widgets") described herein. For example, the plurality of customization elements 1301F may comprise a plurality of control buttons associated with the webinar, such as playback controls (e.g., pause, FF, RWD, etc.), internal and/or external links (e.g., to content within the webinar and/or online), communication links (e.g., email links, chat room/box links), a combination thereof, and/or the like.

Users may interact with the webinars via the user devices 102 and the client application 106. User interaction with the webinars may be monitored by the client application 106. For example, the user activity data 224 associated with the webinars provided by the presentation module 1300 may be monitored via the activity monitoring engine 220. Examples of the user activity data 224 associated with the webinars includes, but is not limited to, interaction with the user interface 1301 (e.g., one or more of the elements 1301A-1301F), interaction with the studio module 1304, a duration of a webinar consumed (e.g., streamed, played), a duration of inactivity during a webinar (e.g., inactivity indicated by the user device 102), a frequency or duration of movement (e.g., movement indicated by indicated by the user device 102), a combination thereof, and/or the like. The user activity data 224 associated with the webinars may be provided to the analytics subsystem 142 via the activity monitoring engine 220.

As shown in FIG. 13A, the presentation module 1300 may comprise a captioning module 1302. The captioning module 1302 may receive user utterance data and/or audio data of a webinar. The user utterance data may comprise one or more words spoken by a presenter(s) (e.g., speaker(s)) and/or an attendee(s) of a webinar. The audio data may comprise audio portions of any media content provided during a webinar, such as an audio track(s) of video content played during a webinar. The captioning module 1302 may convert the user utterance data and/or the audio data into closed captioning/subtitles. For example, the captioning module 1302 may comprise—or otherwise be in communication with—an automated speech recognition engine (not shown).

Figure 13C:
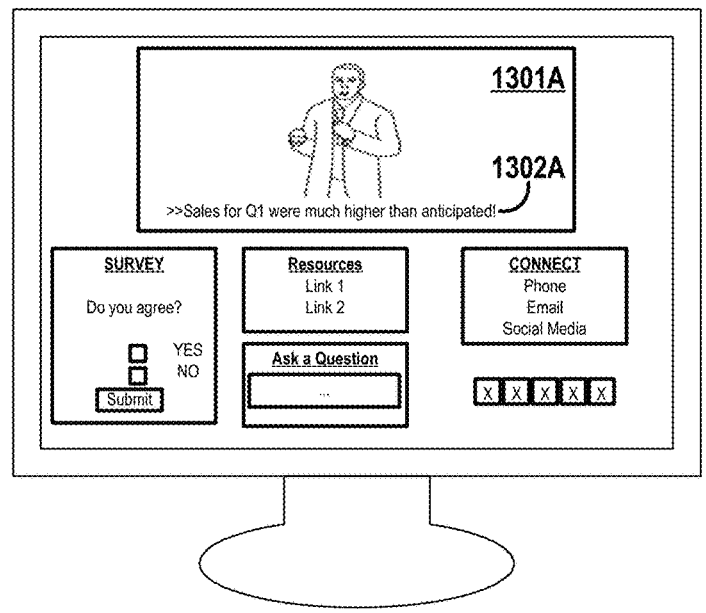
FIG. 13C illustrates another example of a digital experience, in accordance with one or more embodiments of this disclosure.

The automated speech recognition engine may process the user utterance data and output a transcription(s) of the one or more words spoken by the presenter(s) and/or the attendee(s) of the webinar in real-time or near real-time (e.g., for livestreamed content). Similarly, the automated speech recognition engine may process the audio data and output a transcription(s) of the audio portions of the media content provided during the webinar in real-time or near real-time (e.g., for livestreamed content). The captioning module 1302 may generate closed captioning/subtitles corresponding to the transcription(s) output by the automated speech recognition engine. The closed captioning/subtitles may be provided as an overlay 1302A of a webinar, as shown in FIG. 13C.

Figure 14A:
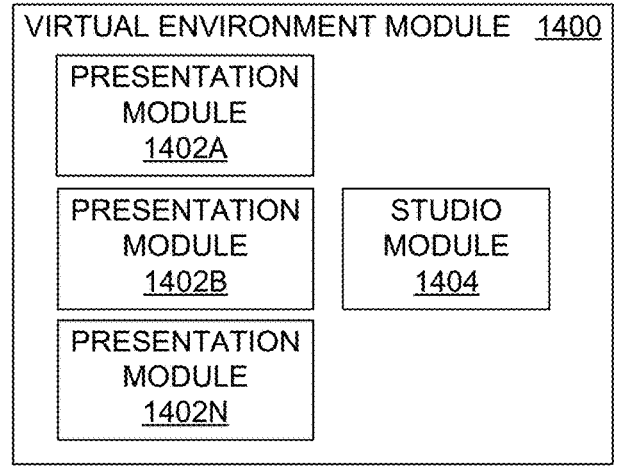
FIG. 14A illustrates a virtual environment module, in accordance with one or more embodiments of this disclosure.
Figure 14B:
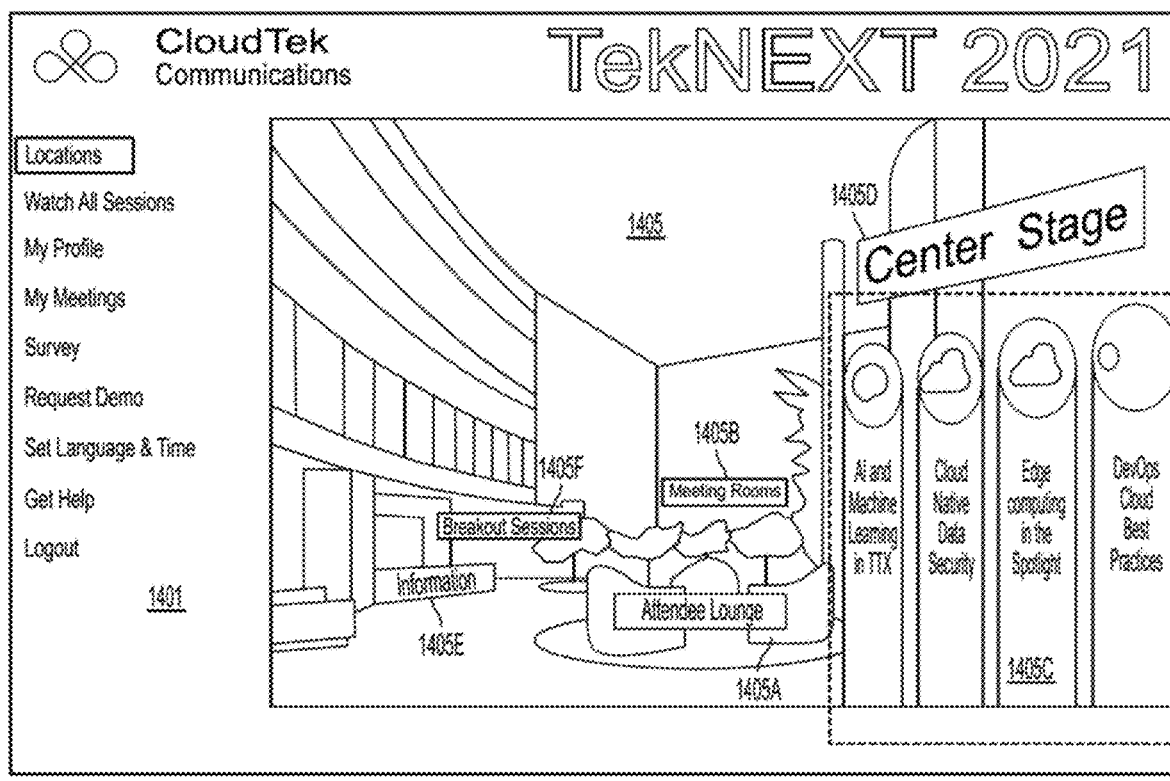
FIG. 14B illustrates an example of an interactive virtual environment, in accordance with one or more embodiments of this disclosure.

FIG. 14A shows a virtual environment module 1400. The virtual environment module 1400 may be a component of the content management subsystem 140. The virtual environment module 1400 may facilitate presentation of, and interactive with, a plurality of the media assets 166 in an interactive virtual environment 1401, as shown in FIG. 14B. For example, the virtual environment module 1400 may facilitate presentation of, and interactive with, a plurality of webinars at the user devices 102 via the client application 106 within the interactive virtual environment 1401. For example, as described herein, the media assets 166 may comprise interactive webinars (e.g., web-based presentations, livestreams, webcasts, etc.) that may be provided via the client application 106 by the presentation module 1300 within the interactive virtual environment 1401.

As shown in FIG. 14A, the virtual environment module 1400 may comprise a plurality of presentation modules 1402A, 1402B, 1402N. Each presentation module of the plurality of presentation modules 1402A, 1402B, 1402N may comprise an individual session, instance, virtualization, etc., of the presentation module 1300. For example, the plurality of presentation modules 1402A, 1402B, 1402N may comprise a plurality of simultaneous webinars (e.g., media assets 166) that are provided by the presentation module 1300 and via the client application 106. The virtual environment module 1400 may enable users of the user devices 102 to interact with each webinar via the interactive virtual environment 1401 and the client application 106.

Each of the plurality of presentation modules 1402A, 1402B, 1402N may comprise a communication session/webinar, such as a chat room/box, an audio call/session, a video call/session, a combination thereof, and/or the like. As an example, and as further described herein, the interactive virtual environment 1401 may comprise a virtual conference/tradeshow, and each of the plurality of presentation modules 1402A, 1402B, 1402N may comprise a communication session that may function as a virtual "vendor booth", "lounge", "meeting room", "auditorium", etc., at the virtual conference/tradeshow. In this way, the plurality of presentation modules 1402A, 1402B, 1402N may enable users at the user devices 102 to communicate with other users and/or devices via the interactive virtual environment 1401 and the client application 106.

Users of the user devices 102 may interact with the interactive virtual environment 1401 via the client application. The service management subsystem 138 may administer (e.g., control) such interactions between the user devices 102 and the interactive virtual environment 1401. For example, the service management subsystem 138 may generate a session identifier (or any other suitable identifier) for each of the communication sessions (e.g., webinars)—or components thereof (e.g., chat rooms/boxes)—within the interactive virtual environment 1401. The service management subsystem 138 may use the session identifiers to ensure that only the user devices 102 associated with a particular communication session (e.g., via registration/sign-up, etc.) may interact with the particular communication session.

As described herein, the media assets 166 may comprise interactive webinars (e.g., web-based presentations, livestreams, webcasts, etc.) that may be provided via the client application 106 by the presentation module 1300 within the interactive virtual environment 1401. The media assets 166 may comprise linear content (e.g., live, real-time content) and/or on-demand (e.g., pre-recorded content). For example, the media assets 166 may be livestreamed within the interactive virtual environment 1401 according to a schedule of a corresponding virtual conference/tradeshow (e.g., a "live" conference/tradeshow). As another example, the media assets 166 corresponding to another virtual conference/tradeshow may be pre-recorded, and the media assets 166 may be accessible via the media repository 164 on-demand via the client application 106. For virtual conferences/tradeshows that are not live or real-time (e.g., the corresponding media assets are pre-recorded), the interactive virtual environment 1401 may nevertheless allow a user(s) of a user device(s) 102 to interact with the virtual conference/tradeshow as if it were live or being held in real-time. As an example, the interactive virtual environment 1401 may allow the user(s) of the user device(s) 102 to interact with an on-demand virtual conference/tradeshow as if the user(s) were actually present when the corresponding communication sessions (e.g., webinars) were being held/recorded. In this way, the user(s) of the user device(s) 102 may interact with the on-demand virtual conference/tradeshow as an observer in simulated-real-time. The user(s) may navigate to different communication sessions of the on-demand virtual conference/tradeshow via the interactive virtual environment 1401, and the user-experience may only be limited in that certain aspects, such as chat rooms/boxes, may not be available for direct interaction. The user(s) may navigate within the on-demand virtual conference/tradeshow via the interactive virtual environment 1401 in 1:1 simulated-real-time or in compressed/shifted time. For example, the user(s) may "fast-forward" or "rewind" to different portions of the on-demand virtual conference/tradeshow via the interactive virtual environment 1401. In this way, the user(s) may be able to skip certain portions of a communication session and/or re-experience certain portions of a communication session of the on-demand virtual conference/tradeshow.

As shown in FIG. 14A, the virtual environment module 1400 may comprise a studio module 1404. The studio module 1404 may function like the studio module 1304 described herein. For example, the studio module 1404 may allow administrators and/or presenters of a virtual conference/tradeshow—or a session/webinar thereof—to record, livestream, and/or upload multimedia presentations/content for the virtual conference/tradeshow. The studio module 1404 may allow administrators and/or presenters of a virtual conference/tradeshow—or a session/webinar thereof—to customize the user experience using the template module 1304A and the plurality of templates (e.g., layouts) stored in the storage repository 1304B. For example, administrators and/or presenters of a virtual conference/tradeshow—or a session/webinar thereof—may use the studio module 1404 to select a template from the plurality of templates stored in the storage repository 1304B. The studio module 1404 may store/save any customization and/or selection made within the studio module 1404 to the storage repository 1304B.

User interaction with virtual conferences/tradeshows via the interactive virtual environment 1401, whether the virtual conferences/tradeshows are real-time or on-demand, may be monitored by the client application 106. For example, user interaction with virtual conferences/tradeshows via the interactive virtual environment 1401 may be monitored via the activity monitoring engine 220 and stored as user activity data 224. The user activity data 224 associated with the virtual conferences/tradeshows may include, as an example, interaction with the user interface 1301 (e.g., one or more of the elements 1301A-401F) within a particular communication session/webinar. As another example, the user activity data 224 associated with the virtual conferences/tradeshows may include interaction with the studio module 1404. Further examples of the user activity data 224 associated with the virtual conferences/tradeshows include, but are not limited to, a duration of a communication session/webinar consumed (e.g., streamed, played), a duration of inactivity during a communication session/webinar (e.g., inactivity indicated by the user device 102), a frequency or duration of movement (e.g., movement indicated by indicated by the user device 102), a combination thereof, and/or the like. The user activity data 224 associated with the virtual conferences/tradeshows may be provided to the analytics subsystem 142 via the activity monitoring engine 220.

FIG. 14B shows an example lobby 1405 of a virtual conference/tradeshow within the interactive virtual environment 1401. The interactive virtual environment 1401 provided via the client application 106 may enable a visual, audible, and/or physical interaction between the users of the user devices 102 and areas/events within a virtual conference/tradeshow, as indicated by the lobby 1405. For example, as shown in the lobby 1405 in FIG. 14B, the interactive virtual environment 1401 may provide the users of the user devices 102 with a rendered scene of a virtual conference/tradeshow. As discussed above, the interactive virtual environment 1401 may allow the users of the user devices 102 to interact with the virtual conference/tradeshow in real-time or on-demand. The manner in which the users of the user devices 102 interact with the virtual conference/tradeshow may correspond to capabilities of the user devices 102. For example, if a particular user device 102 is a smart phone, user interaction may be facilitated by a user interacting with a touch screen of the smart phone. As another example, if a particular user device 102 is a computer or gaming console, user interaction may be facilitated by a user via a keyboard, mouse, and/or a gaming controller. Other examples are possible as well. The user devices 102 may include additional components that enable user interaction, such as sensors, cameras, speakers, etc. The interactive virtual environment 1401 of a virtual conference/tradeshow may be presented via the client application 106 in various formats such as, for example, two-dimensional or three-dimensional visual displays (including projections), sound, haptic feedback, and/or tactile feedback. The interactive virtual environment 1401 may comprise, for example, portions using augmented reality, virtual reality, a combination thereof, and/or the like.

A user may interact with the lobby 1405 via the interactive virtual environment 1401 and the user interface(s) 1301 of the client application 106. As an example, as shown in FIG. 14B, the lobby 1405 may allow a user to navigate to a virtual attendee lounge 1405A, meeting rooms 1405B, a plurality of presentations 1405C at a virtual auditorium ("Center Stage") 1405D, an information desk 1405E, and breakout sessions 1405F. The virtual attendee lounge 1405A, the meeting rooms 1405B, each of the plurality of presentations 1405C at the virtual auditorium 1405D, the information desk 1405D, and the breakout sessions 1405F may be facilitated by the virtual environment module 1400 and the plurality of presentation modules 1402A, 1402B, 1402N.

The presentation module 1402A may be associated with a first part of the virtual conference/tradeshow, such as the virtual attendee lounge 1405A, the presentation module 1402B may be associated with another part of the virtual conference/tradeshow, such one or more of the breakout sessions 1405F, and the presentation module 1402N may be associated with a further part of the virtual conference/tradeshow, such as one or more of the plurality of presentations 1405C in the virtual auditorium ("Center Stage") 1405D. As an example, a user may choose to view one of the plurality of presentations 1405C. As discussed herein, the user device(s) 102 may be smart phones, in which case the user may touch an area of a screen of the smart phone displaying the particular presentation of the plurality of presentations 1405C he or she wishes to view. The presentation module 1402N may receive a request from the smart phone via the client device 106 indicating that the user wishes to view the particular presentation. The presentation module 1402N may cause the smart phone, via the client application 106, to render a user interface associated with the particular presentation, such as the user interface 1301. The user may view the particular presentation and interact therewith via the user interface in a similar manner as described herein with respect to the user interface 1301. The user interface associated with the presentation may comprise an exit option, such as a button (e.g., a customization element 1301F), which may cause the smart phone, via the client application 106, to "leave" the presentation and "return" the user to the lobby 1405. For example, the user may press on an area of the smart phone's screen displaying the exit option/button, and the presentation module 1402N may cause the smart phone, via the client application 106, to render the lobby 1405 (e.g., "returning" the user to the lobby of the virtual conference/tradeshow).

In some embodiments, the analytics subsystem 142 may also determine digital content (e.g., media assets) that is/are like other digital content that is present in a corpus digital content for a user device (e.g., associated with a user profile/UIC). For example, the analytics subsystem 142 can generate a recommendation for the similar content and can then send the recommendation to a user device.

Figure 15:
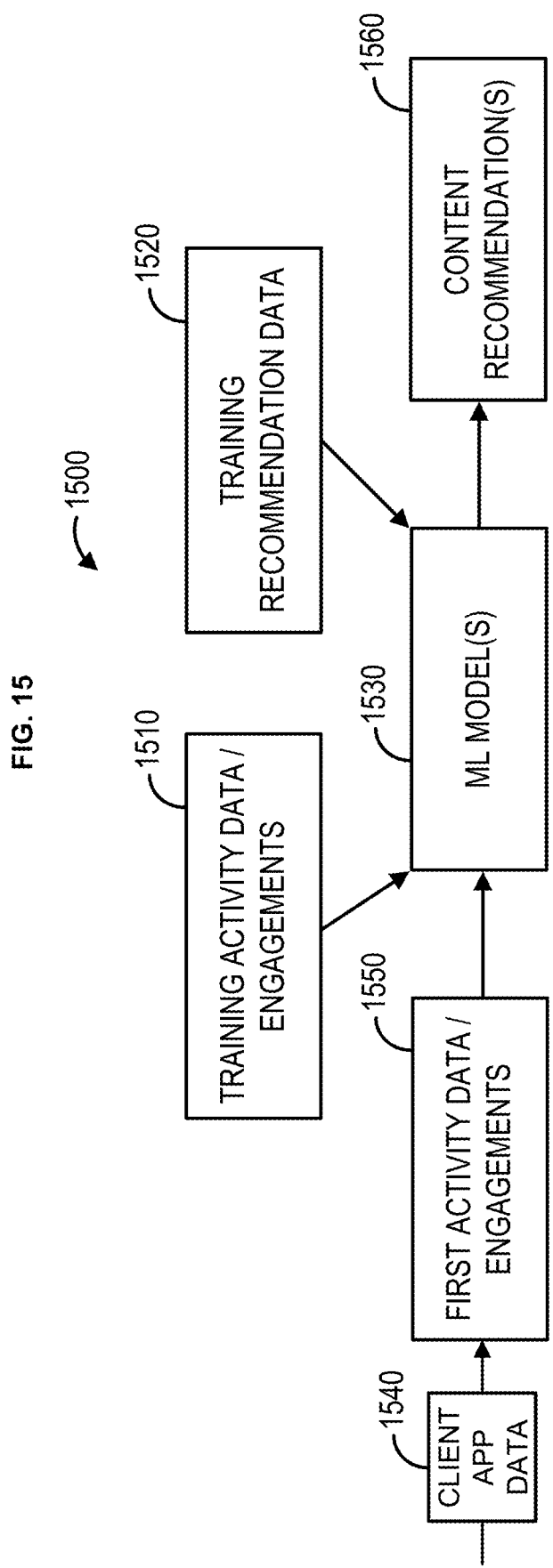
FIG. 15 illustrates an example system, in accordance with one or more embodiments of this disclosure.

FIG. 15 shows an example system 1500 for providing content recommendations based on user activity data. As described herein, a third-party subsystem 610 can include various types of subsystems that permit insights generated by the analytics subsystem 142 to be extracted and leveraged across systems of a source/content platform. Each third-party subsystem 610 may be referred to herein as a "client system" or simply as a "client". The presentation platform described herein may access, control, etc., each of the third-party subsystems 610. Each third-party subsystem 610 may be associated with a unique client model, and each unique client model may be maintained by the analytics subsystem 142 (e.g., each client model may be accessible by the analytics subsystem 142). Each client model may comprise at least one of: the feature extraction unit 210, the activity monitoring unit 220, the scoring unit 230, the scoring model(s) 248, or the profile generation unit 250 as described herein. Each client model may be customized based on a number of media assets (e.g., digital content) the particular client has uploaded/produced for distribution by the present distribution platform. Each client model may comprise the components of the system 1500 shown in FIG. 15. For example, the system 1500 as described herein may be representative of how a particular client model may function for a particular client/system within the analytics subsystem 142. The system 1500 may provide content recommendations based on user activity data for users associated with the particular client/system.

The system shown in FIG. 15 may relate to an "online" or "live" service. For example, the "online" or "live" service may provide a recommendation for content (e.g., a media asset(s)) in real-time as users associated with the particular client are engaging with the client application 106. The system shown in FIG. 15 may relate to "offline" services as well (or in the alternative). For example, the "offline" services may be used to update UICs and the particular client model periodically or based on a predetermine/defined triggering event.

As described herein, user interaction with the client application 106 (e.g., consumption/engagement with media assets) may generate activity data (e.g., user activity data). The activity data may be indicative of a user's engagement/interaction(s) with media assets via the client application 106. For example, as shown in FIG. 15, the client application 106 may generate client application data 1540. The client application data 1540 may be indicative of (or comprise) first activity data/engagement data 1550 (referred to herein for simplicity as "first activity data 1550"). The first activity data 1550 may be indicative of a plurality of first engagements with a first plurality of media assets (e.g., one or more of the media assets 166) via a first user device (e.g., a user device 102) and the client application 106. The analytics subsystem 142 may receive the client application data 1540 via the client application 106 executing on the first user device. The analytics subsystem 142 may derive or determine the first activity data 1550 based on the client application data 1540.

Figure 16:
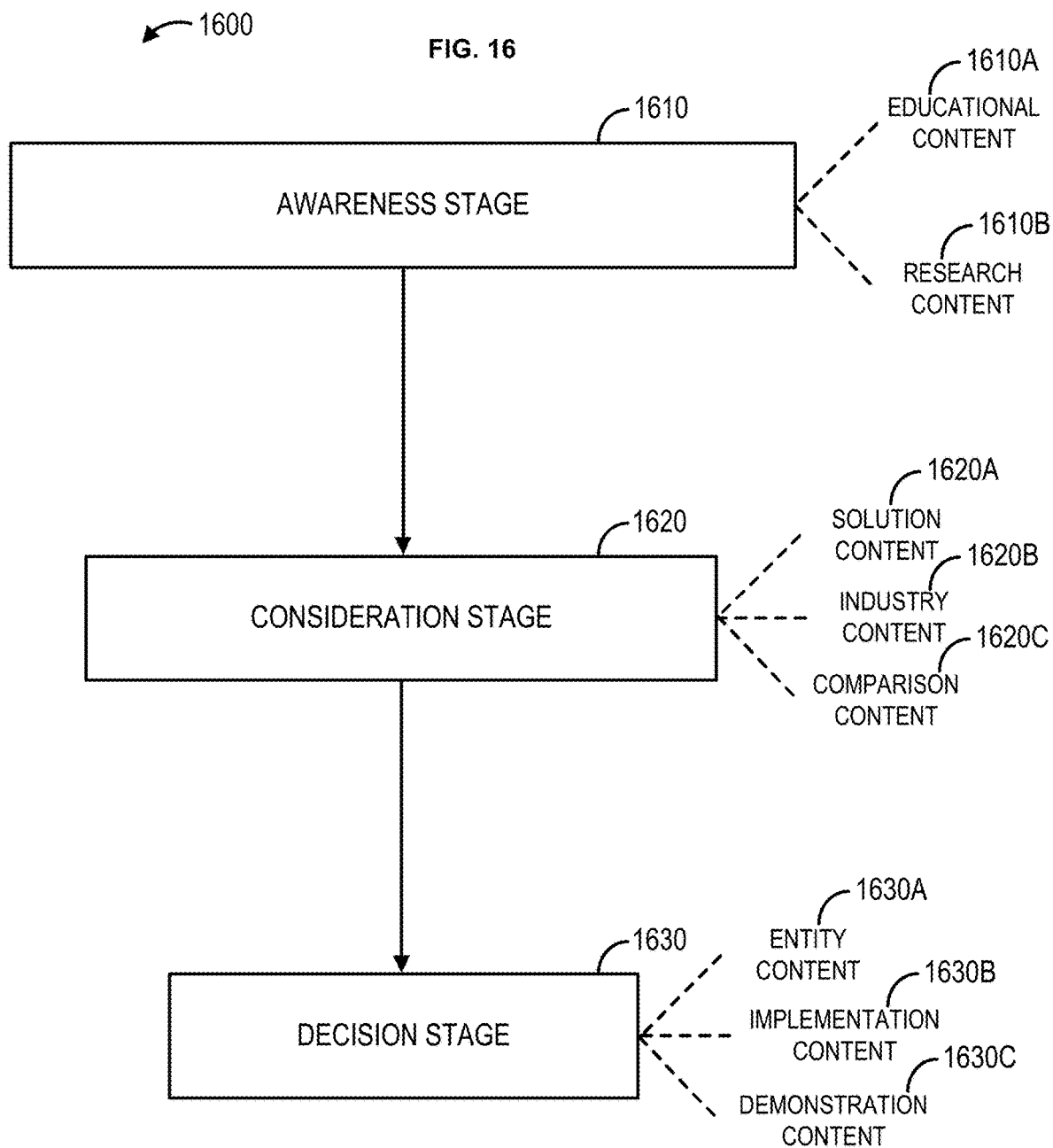
FIG. 16 illustrates an example model chart, in accordance with one or more embodiments of this disclosure.

The analytics subsystem 142 may determine metadata associated with each media asset of the first plurality of media assets. For example, the metadata associated with each media asset of the first plurality of media assets may comprise at least one first media asset classification. The at least one first media asset classification may correspond to different classifications of media assets. Each of those classifications may be associated with a type of user behavior. For example, FIG. 16 shows an example model chart 1600 for a "user interest journey." The user interest journey may correspond to user behavior in terms of content consumption/interaction as it relates to decisions (e.g., a buying decision, a strategy decision, a business decision, etc.). The model chart 1600 includes an awareness stage 1610, a consideration stage 1620, and a decision stage 1630. The first activity data 1550 may identify where in the user interest journey the user may be based on their corresponding media asset consumption/interaction habits (e.g., indicated by the first activity data first activity data 1550).

For example, the at least one first media asset classification may be indicative of consumption/interaction with one or more media assets having an educational content 1610A or research content 1610B classification. Media assets that generally describe concepts, ideas, problems, solutions, etc. may have either, or both, of these classifications. These classifications may be determined by the client, by the analytics subsystem 142, a third-party, a combination there, and/or the like. The educational content 1610A and research content 1610B classifications may correspond to the awareness stage 1610 of the user interest journey. At this stage, the user's media asset consumption/interaction (e.g., user behavior) may indicate that he or she is aware of a decision that needs to be made or a problem that needs to be solved. Accordingly, the media assets he or she may consume or interact with may be classified as educational content 1610A or research content 1610B classification.

As another example, the at least one first media asset classification may be indicative of consumption/interaction with one or more media assets having a solution content 1620A classification, an industry content 1620B classification, or a comparison content 1610B classification. Media assets that describe specific concepts, ideas, problems, solutions, companies, industries, etc. may have one or more of these classifications. These classifications may be determined by the client, by the analytics subsystem 142, a third-party, a combination there, and/or the like. The solution content 1620A, industry content 1620B, and comparison content 1620C classifications may correspond to the consideration stage 1620 of the user interest journey. At this stage, the user's media asset consumption/interaction (e.g., user behavior) may indicate that he or she is now determining how they intend to solve the problem at hand or make the decision that is needed. Accordingly, the media assets he or she may consume or interact with may be classified as solution content 1620A, industry content 1620B, or comparison content 1620C.

As a further example, the at least one first media asset classification may be indicative of consumption/interaction with one or more media assets having an entity content 1630A classification, an implementation content 1630B classification, or a demonstration content 1630C classification. Media assets that describe particular solutions, companies, methods, products/services, etc. may have one or more of these classifications. These classifications may be determined by the client, by the analytics subsystem 142, a third-party, a combination there, and/or the like. The entity content 1630A classification, the implementation content 1630B classification, and the demonstration content 1630C may correspond to the decision stage 1630 of the user interest journey. At this stage, the user's media asset consumption/interaction (e.g., user behavior) may indicate that he or she is now deciding between several optional solutions, methods, implementations, etc., for the problem or decision at hand. Accordingly, the media assets he or she may consume or interact with may be classified as entity content 1630A, implementation content 1630B, or demonstration content 1630C.

The analytics subsystem 142 may determine, based on the at least one first media asset classification, at least one machine learning model 1530 of a plurality of machine learning models. Each of the plurality of machine learning models may be trained using training activity data/engagements 1510 (referred to herein as "training activity data 1510") and/or training recommendation data 1520 that corresponds to media asset consumption/interaction for one or more users who are at a further position within the user interest journey as shown in the model chart 1600 as compared to the user corresponding to the first activity data 1550. For example, the at least one machine learning model 1530 may be trained such that an input of the first activity data 1550 may result in an output of at least one content recommendation 1560. For example, the at least one content recommendation 1560 may comprise a recommendation for at least one media asset. The at least one media asset may be associated with at least one second media asset classification, which may differ from the at least one first media asset classification. For example, the at least one first media asset classification may comprise research content 1610B (e.g., corresponding to the awareness stage 1610), while the at least one second media asset classification may comprise industry content 1620B (e.g., corresponding to the consideration stage 1620).

The first activity data 1550 may be associated with a first UIC. When training the at least one machine learning model 1530, the analytics subsystem 142 may determine/retrieve the training activity data 1510 and the training recommendation data 1520 based on a plurality of UICs for other users that are similar to the first UIC. For example, based on the first UIC associated with the first user profile, a plurality of similar user profiles associated with corresponding UICs that are similar to the first interest cloud may be determined/retrieved.

Some users associated with the plurality of similar user profiles may be "converting users," while other users associated with the plurality of similar user profiles may be "non-converting user." The phrase "converting users" may refer to those users who progressed through the user interest journey shown in the model chart 1600 and ultimately obtained a product/service/subscription, etc., associated with a presenter/creator of at least one media asset categorized within the decision stage 1630 (e.g., a media asset(s) having an entity content 1630A classification, an implementation content 1630B classification, or a demonstration content 1630C classification). The phrase "non-converting users" may refer to those users who either (1) progressed through the user interest journey shown in the model chart 1600 but ultimately did not obtain a product/service/subscription, etc., associated with a presenter/creator of at least one media asset categorized within the decision stage 1630; or (2) did not progress through the entire user interest journey shown in the model chart 1600. A first subset of the plurality of similar user profiles may be associated with the non-converting users, and a second subset of the plurality of similar user profiles may be associated with the converting users. For example, the first subset and the second subset may be used separately for purposes of training the at least one machine learning model 1530.

Based on the plurality of similar user profiles, second activity data indicative of a plurality of second engagements associated with the plurality of similar user profiles may be determined/retrieved. The training activity data 1510 and/or the training recommendation data 1520 may be based on (e.g., derived from) the second activity data (e.g., the plurality of second engagements). The plurality of second engagements may be associated with a second plurality of media assets, which may have at least one media asset in common with the first plurality of media assets described above. Each media asset of the second plurality of media assets may comprise or be associated with metadata. The metadata associated with each media asset of the second plurality of media assets may comprise or be indicative of the at least one second media asset classification described above. The analytics subsystem 142 may therefore train the at least one machine learning model 1530 based on the second plurality of engagements and the plurality of similar user profiles (e.g., based on the training activity data 1510 and/or the training recommendation data 1520).

Once trained, the at least one machine learning model 1530 may be configured to receive an input of activity data, such as the first activity data 1550, and to determine at least one content recommendation 1560 on that basis. The analytics subsystem 142 may send the at least one content recommendation to the first user device via the client application 106. The analytics subsystem 142 may send the at least one content recommendation to the first user device as a notification, an instruction, a message, a combination thereof, and/or the like. For example, sending the at least one content recommendation may comprise the analytics subsystem 142 causing the first user device to output the at least one content recommendation 1560 (e.g., video, audio, notification(s), message(s), etc.) via the client application 106. As another example, sending the at least one content recommendation may comprise the analytics subsystem 142 causing the client application 106 to output (e.g., present, display, show, etc.) at least one media asset associated with the at least one content recommendation 1560. As another example, sending the at least one content recommendation may comprise the analytics subsystem 142 sending a first instruction to the first user device, and the first instruction may be configured to cause the client application 106 to output a notification associated with the at least one media asset. In still a further example, sending the at least one content recommendation may comprise the analytics subsystem 142 sending a second instruction to the first user device, and the second instruction may be configured to cause the client application 106 to add the at least one media asset to a playlist associated with the first user profile. Other examples are possible as well.

The at least one content recommendation 1560 may be accompanied by a certainty match. As long as the certainty match is above a configurable threshold, it may be considered suitable. In some cases, multiple recommendations 1560 may be presented, and in others, only one may be presented. These recommendations 1560 may also be filtered for content the first user/first user device has already encountered in the past, so the first user/first user device is not provided with a recommendation 1560 that includes a media asset(s) with which the first user/first user device has already engaged.

Any of the machine learning models or scoring models described herein, such as the scoring models 248 and/or the at least one machine learning model 1530, may be trained and/or retrained using training datasets comprising user activity data and/or UICs. The training datasets may comprise UICs associated with users who interacted with (e.g., engaged with) a plurality of media assets. The UICs that are used during training and/or retraining may comprise interest attributes, interest levels, functionality features, a content features, a combination thereof, and/or the like. A training module, such as the training module 1720 shown in FIG. 17, may then determine which features in the UICs correlate with the particular features of the plurality of media assets. The machine learning models, once trained (or retrained as the case may be), may provide a recommendation for a user(s) and a media asset(s) based on the corresponding UIC(s) and the features of that media asset.

Figure 17:
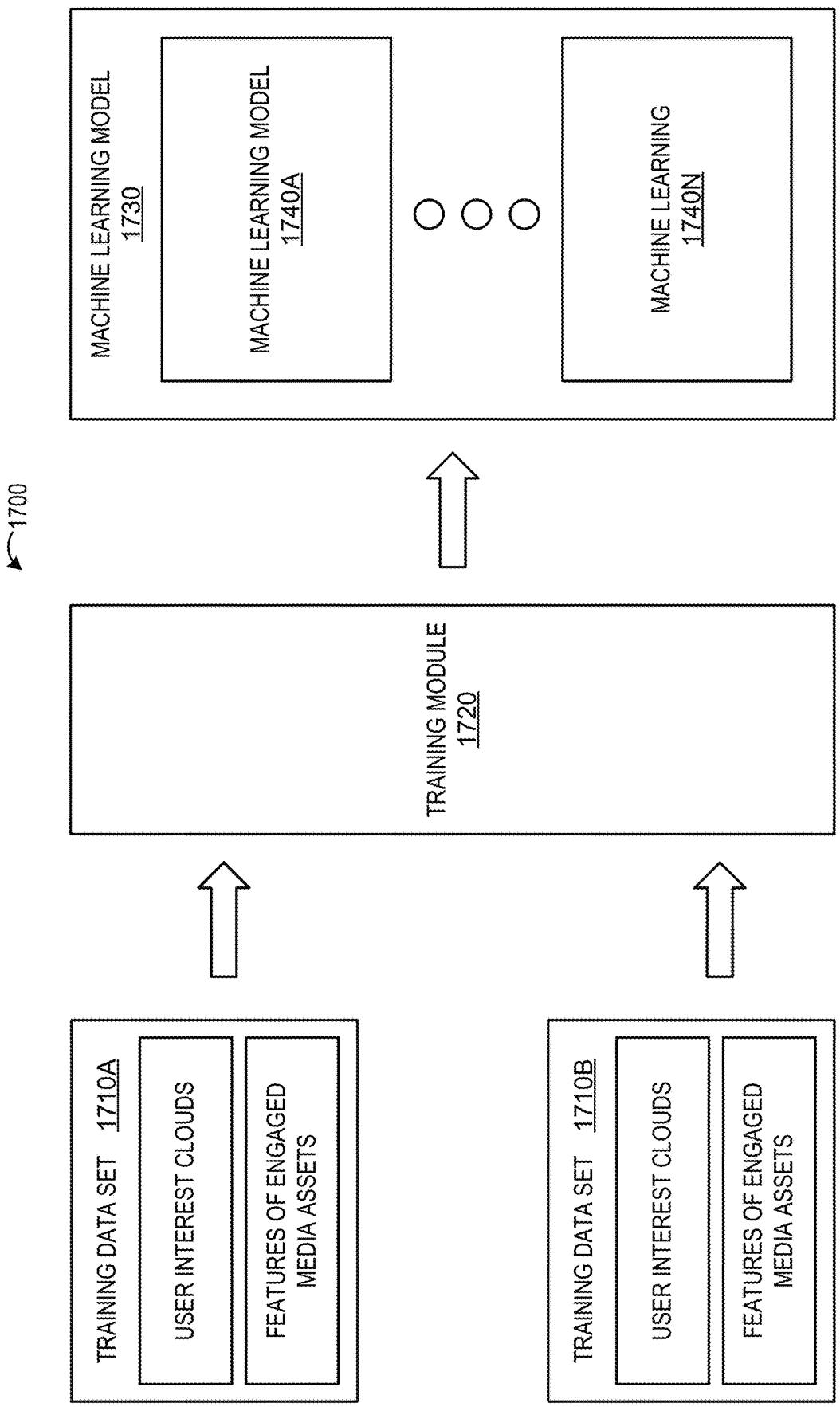
FIG. 17 illustrates an example system, in accordance with one or more embodiments of this disclosure.

Any of the machine learning models or scoring models described herein (e.g., the at least one machine learning model 1530) may be referred to as "at least one machine learning model 1730" or simply the "machine learning model 1730" with reference to FIG. 17. The at least one machine learning model 1730 may be trained by a system 1700 as shown in FIG. 17. The system 1700 may be configured to use machine learning techniques to train, based on an analysis of one or more training datasets 1710A-1710B by a training module 1720, the at least one machine learning model 1730. The at least one machine learning model 1730, once trained, may be configured to determine a prediction that a media asset is of interest to a particular user or not of interest to the particular user. A dataset indicative of a plurality of media assets and a labeled (e.g., predetermined/known) prediction indicating whether the corresponding media assets are of interest to a particular user or not may be used by the training module 1720 to train the at least one machine learning model 1730. Each of the plurality of media assets in the dataset may be associated with a plurality of features that are present within each corresponding media asset. The plurality of features and the labeled predictions may be used to train the at least one machine learning model 1730.

The training datasets 1710A and 1710B may each comprise one or more portions of the training activity data 1510 and/or the training recommendation data 1520. As described herein, the training activity data 1510 and the training recommendation data 1520 may be associated with the plurality of media assets and the dataset described above. The training dataset 1710A may comprise a first portion of the plurality of media assets in the dataset. Each media asset in the first portion may have a labeled (e.g., predetermined) prediction and one or more labeled features. The training dataset 1710B may comprise a second portion of the plurality of media assets in the dataset. Each media asset in the second portion may have a labeled (e.g., predetermined) prediction and one or more labeled features. The plurality of media assets may be randomly assigned to the training dataset 1710A, the training dataset 1710B, and/or to a testing dataset. In some implementations, the assignment of media assets to a training dataset or a testing dataset may not be completely random. In this case, one or more criteria may be used during the assignment, such as ensuring that similar numbers of media assets with different predictions and/or features are in each of the training and testing datasets. In general, any suitable method may be used to assign the media assets to the training or testing datasets, while ensuring that the distributions of predictions and/or features are somewhat similar in the training dataset and the testing dataset.

The training module 1720 may use the first portion and the second portion of the plurality of media assets to determine one or more features that are indicative of a high prediction. That is, the training module 1720 may determine which features present within the plurality of media assets are correlative with a high prediction. The one or more features indicative of a high prediction may be used by the training module 1720 to train the machine learning model 1730. For example, the training module 1720 may train the machine learning model 1730 by extracting a feature set (e.g., one or more features) from the first portion in the training dataset 1710A according to one or more feature selection techniques. The training module 1720 may further define the feature set obtained from the training dataset 1710A by applying one or more feature selection techniques to the second portion in the training dataset 1710B that includes statistically significant features of positive examples (e.g., high predictions) and statistically significant features of negative examples (e.g., low predictions). The training module 1720 may train the machine learning model 1730 by extracting a feature set from the training dataset 1710B that includes statistically significant features of positive examples (e.g., high predictions) and statistically significant features of negative examples (e.g., low predictions).

The training module 1720 may extract a feature set from the training dataset 1710A and/or the training dataset 1710B in a variety of ways. For example, the training module 1720 may extract a feature set from the training dataset 1710A and/or the training dataset 1710B using a classification model (e.g., a machine learning model). The training module 1720 may perform feature extraction multiple times, each time using a different feature-extraction technique. In one example, the feature sets generated using the different techniques may each be used to generate different machine learning models 1740. For example, the feature set with the highest quality features (e.g., most indicative of interest or not of interest to a particular user(s)) may be selected for use in training. The training module 1720 may use the feature set(s) to build one or more machine learning models 1740A-1740N that are configured to determine a prediction for a new, unseen media asset.

The training dataset 1710A and/or the training dataset 1710B may be analyzed to determine any dependencies, associations, and/or correlations between features and the labeled predictions in the training dataset 1710A and/or the training dataset 1710B. The identified correlations may have the form of a list of features that are associated with different labeled predictions (e.g., of interest to a particular user vs. not of interest to a particular user). The term "feature", as used herein, may refer to any characteristic of an item of data that may be used to determine whether the item of data falls within one or more specific categories or within a range. By way of example, the features described herein may comprise one or more features present within each of the media assets that may be correlative (or not correlative as the case may be) with a particular media asset being of interest to a particular user or not. As another example, the features described herein may comprise an interest attribute, an interest level, a functionality feature, or a content feature as further described and defined herein.

A feature selection technique may comprise one or more feature selection rules. The one or more feature selection rules may comprise a feature occurrence rule. The feature occurrence rule may comprise determining which features in the training dataset 1710A occur over a threshold number of times and identifying those features that satisfy the threshold as candidate features. For example, any features that appear greater than or equal to 5 times in the training dataset 1710A may be considered as candidate features. Any features appearing less than, for example, 5 times may be excluded from consideration as a candidate feature. Other threshold numbers may be used as well.

A single feature selection rule may be applied to select features or multiple feature selection rules may be applied to select features. The feature selection rules may be applied in a cascading fashion, with the feature selection rules being applied in a specific order and applied to the results of the previous rule. For example, the feature occurrence rule may be applied to the training dataset 1710A to generate a first list of features. A final list of features may be analyzed according to additional feature selection techniques to determine one or more candidate feature groups (e.g., groups of features that may be used to determine a prediction). Any suitable computational technique may be used to identify the feature groups using any feature selection technique such as filter, wrapper, and/or embedded methods. One or more candidate feature groups may be selected according to a filter method. Filter methods include, for example, Pearson's correlation, linear discriminant analysis, analysis of variance (ANOVA), chi-square, combinations thereof, and the like. The selection of features according to filter methods are independent of any machine learning algorithms used by the system 1700. Instead, features may be selected on the basis of scores in various statistical tests for their correlation with the outcome variable (e.g., a prediction).

As another example, one or more candidate feature groups may be selected according to a wrapper method. A wrapper method may be configured to use a subset of features and train the machine learning model 1730 using the subset of features. Based on the inferences that may be drawn from a previous model, features may be added and/or deleted from the subset. Wrapper methods include, for example, forward feature selection, backward feature elimination, recursive feature elimination, combinations thereof, and the like. For example, forward feature selection may be used to identify one or more candidate feature groups. Forward feature selection is an iterative method that begins with no features. In each iteration, the feature which best improves the model is added until an addition of a new variable does not improve the performance of the model. As another example, backward elimination may be used to identify one or more candidate feature groups. Backward elimination is an iterative method that begins with all features in the model. In each iteration, the least significant feature is removed until no improvement is observed on removal of features. Recursive feature elimination may be used to identify one or more candidate feature groups. Recursive feature elimination is a greedy optimization algorithm which aims to find the best performing feature subset. Recursive feature elimination repeatedly creates models and keeps aside the best or the worst performing feature at each iteration. Recursive feature elimination constructs the next model with the features remaining until all the features are exhausted. Recursive feature elimination then ranks the features based on the order of their elimination.

As a further example, one or more candidate feature groups may be selected according to an embedded method.

Embedded methods combine the qualities of filter and wrapper methods. Embedded methods include, for example, Least Absolute Shrinkage and Selection Operator (LASSO) and ridge regression which implement penalization functions to reduce overfitting. For example, LASSO regression performs L1 regularization which adds a penalty equivalent to absolute value of the magnitude of coefficients and ridge regression performs L2 regularization which adds a penalty equivalent to square of the magnitude of coefficients.

After the training module 1720 has generated a feature set(s), the training module 1720 may generate the one or more machine learning models 1740A-1740N based on the feature set(s). A machine learning model (e.g., any of the one or more machine learning models 1740A-1740N) may refer to a complex mathematical model for data classification that is generated using machine-learning techniques as described herein. In one example, a machine learning model may include a map of support vectors that represent boundary features. By way of example, boundary features may be selected from, and/or represent the highest-ranked features in, a feature set.

The training module 1720 may use the feature sets extracted from the training dataset 1710A and/or the training dataset 1710B to build the one or more machine learning models 1740A-1740N for each classification category (e.g., "of interest to a particular user media asset" and "not of interest to the particular user media asset"). In some examples, the one or more machine learning models 1740A-340N may be combined into a single machine learning model 1740 (e.g., an ensemble model). Similarly, the machine learning model 1730 may represent a single classifier containing a single or a plurality of machine learning models 1740 and/or multiple classifiers containing a single or a plurality of machine learning models 1740 (e.g., an ensemble classifier).

The extracted features (e.g., one or more candidate features) may be combined in the one or more machine learning models 1740A-1740N that are trained using a machine learning approach such as discriminant analysis; decision tree; a nearest neighbor (NN) algorithm (e.g., k-NN models, replicator NN models, etc.); statistical algorithm (e.g., Bayesian networks, etc.); clustering algorithm (e.g., k-means, mean-shift, etc.); neural networks (e.g., reservoir networks, artificial neural networks, etc.); support vector machines (SVMs); logistic regression algorithms; linear regression algorithms; Markov models or chains; principal component analysis (PCA) (e.g., for linear models); multi-layer perceptron (MLP) ANNs (e.g., for non-linear models); replicating reservoir networks (e.g., for non-linear models, typically for time series); random forest classification; a combination thereof and/or the like. The resulting machine learning model 1730 may comprise a decision rule or a mapping for each candidate feature in order to assign a prediction to a class (e.g., of interest to a particular user vs. not of interest to the particular user). As described herein, the machine learning model 1730 may be used to determine predictions for media assets. The candidate features and the machine learning model 1730 may be used to determine predictions for media assets in the testing dataset (e.g., a third portion of the plurality of media assets).

Figure 18:
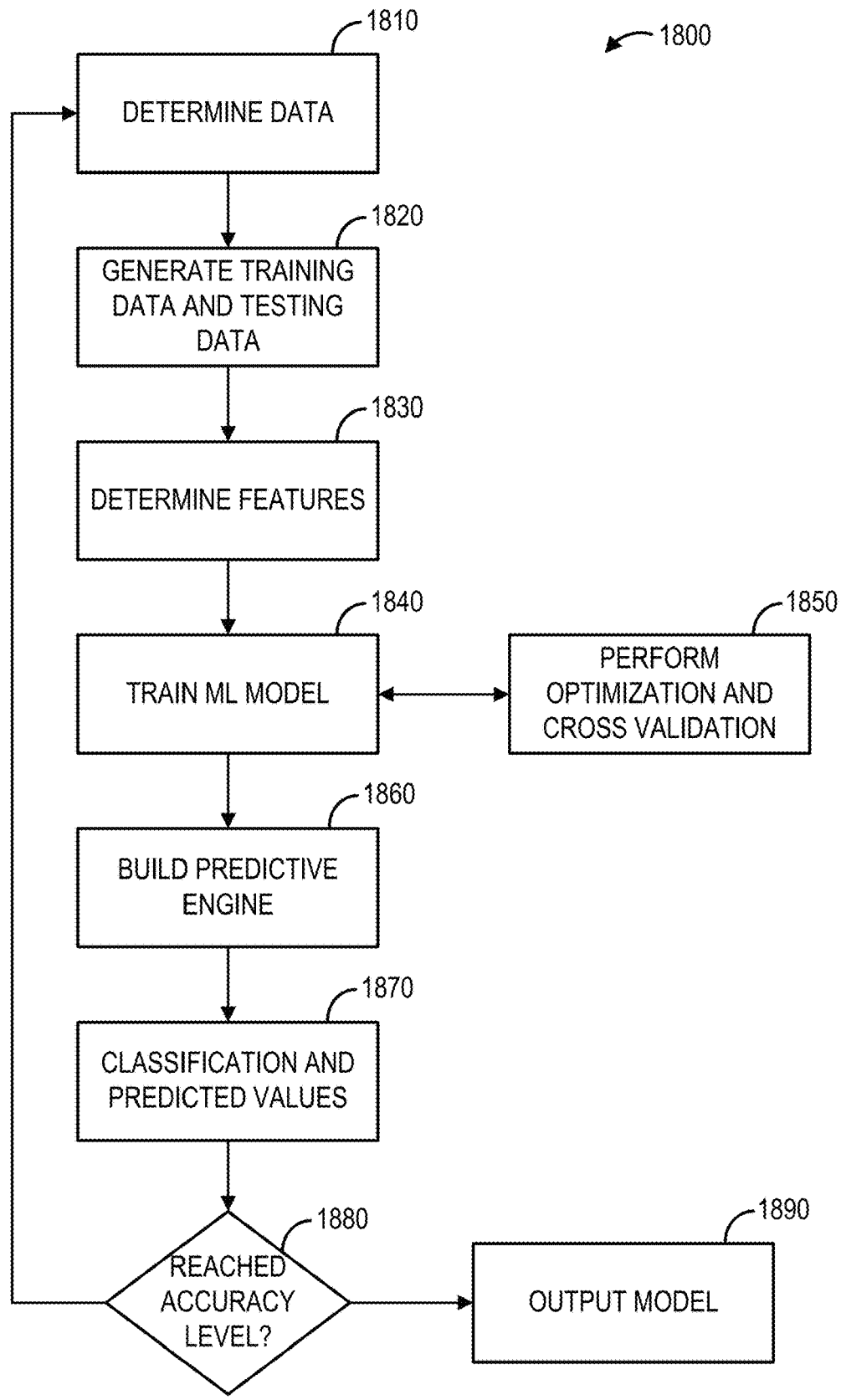
FIG. 18 illustrates a flowchart for an example method, in accordance with one or more embodiments of this disclosure.

FIG. 17 shows a flowchart illustrating an example training method 1700 for generating the machine learning model 1730 using the training module 1720. The training module 1720 may implement supervised, unsupervised, and/or semi-supervised (e.g., reinforcement based) machine learning models 1740A-1740N. The method 1800 illustrated in FIG. 18 is an example of a unsupervised learning method; variations of this example of training method are discussed below, however, other training methods may be analogously implemented to train unsupervised and/or semi-supervised machine learning models. The method 1800 may be implemented by any one of the devices, components, units, or modules shown in FIG. 1-3, 5-7, 9, or 12-16.

At step 1810, the training method 1800 may determine (e.g., access, receive, retrieve, etc.) first media assets and second media assets. The first media assets and the second media assets may each comprise one or more features and a predetermined prediction (e.g., a recommendation). The training method 1800 may generate, at step 1820, a training dataset and a testing dataset. The training dataset and the testing dataset may be generated by randomly assigning media assets from the first media assets and/or the second media assets to either the training dataset or the testing dataset. In some implementations, the assignment of media assets as training or test samples may not be completely random. As an example, only the media assets for a specific feature(s) and/or range(s) of predetermined predictions may be used to generate the training dataset and the testing dataset. As another example, a majority of the media assets for the specific feature(s) and/or range(s) of predetermined predictions may be used to generate the training dataset. For example, 75% of the media assets for the specific feature(s) and/or range(s) of predetermined predictions may be used to generate the training dataset and 25% may be used to generate the testing dataset.

The training method 1800 may determine (e.g., extract, select, etc.), at step 1830, one or more features that may be used by, for example, a classifier to differentiate among different classifications (e.g., predictions/recommendations). The one or more features may comprise a set of features. As an example, the training method 1800 may determine a set features from the first media assets. As another example, the training method 1800 may determine a set of features from the second media assets. In a further example, a set of features may be determined from other media assets of the plurality of media assets (e.g., a third portion) associated with a specific feature(s) and/or range(s) of predetermined predictions that may be different than the specific feature(s) and/or range(s) of predetermined predictions associated with the media assets of the training dataset and the testing dataset. In other words, the other media assets (e.g., the third portion) may be used for feature determination/selection, rather than for training. The training dataset may be used in conjunction with the other media assets to determine the one or more features. The other media assets may be used to determine an initial set of features, which may be further reduced using the training dataset.

The training method 1800 may train one or more machine learning models (e.g., one or more machine learning models, neural networks, deep-learning models, etc.) using the one or more features at step 1840. In one example, the machine learning models may be trained using supervised learning. In another example, other machine learning techniques may be used, including unsupervised learning and semi-supervised. The machine learning models trained at step 1840 may be selected based on different criteria depending on the problem to be solved and/or data available in the training dataset. For example, machine learning models may suffer from different degrees of bias. Accordingly, more than one machine learning model may be trained via 1840, and then optimized, improved, and cross-validated at step 1850.

The training method 1800 may select one or more machine learning models to build the machine learning model 1730 at step 1860. The machine learning model 1730 may be evaluated using the testing dataset. The machine learning model 1730 may analyze the testing dataset and generate classification values and/or predicted values (e.g., predictions) at step 1870. Classification and/or prediction values may be evaluated at step 1880 to determine whether such values have achieved a desired accuracy level. Performance of the machine learning model 1730 may be evaluated in a number of ways based on a number of true positives, false positives, true negatives, and/or false negatives classifications of the plurality of data points indicated by the machine learning model 1730.

For example, the false positives of the machine learning model 1730 may refer to a number of times the machine learning model 1730 incorrectly assigned a high prediction to a media asset associated with a low predetermined prediction. Conversely, the false negatives of the machine learning model 1730 may refer to a number of times the machine learning model assigned a low prediction to a media asset associated with a high predetermined prediction. True negatives and true positives may refer to a number of times the machine learning model 1730 correctly assigned predictions to media assets based on the known, predetermined prediction for each media asset. Related to these measurements are the concepts of recall and precision. Generally, recall refers to a ratio of true positives to a sum of true positives and false negatives, which quantifies a sensitivity of the machine learning model 1730. Similarly, precision refers to a ratio of true positives a sum of true and false positives. When such a desired accuracy level is reached, the training phase ends and the machine learning model 1730 may be output at step 1890; when the desired accuracy level is not reached, however, then a subsequent iteration of the training method 1800 may be performed starting at step 1710 with variations such as, for example, considering a larger collection of media assets. The machine learning model 1730 may be output at step 1890. The machine learning model 1730 may be configured to determine predicted predictions for media assets that are not within the plurality of media assets used to train the machine learning model.

Figure 19:
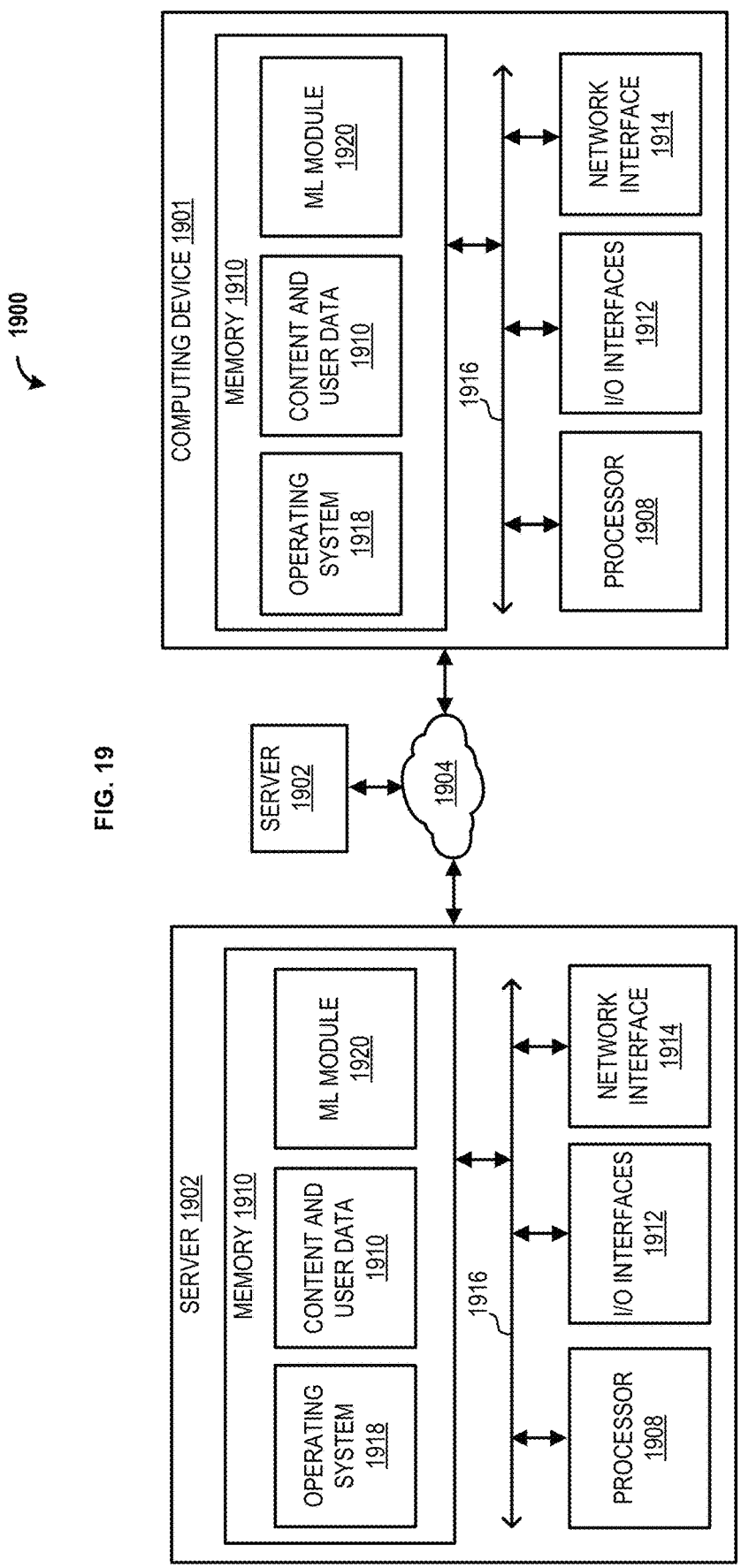
FIG. 19 illustrates an example system, in accordance with one or more embodiments of this disclosure.

As discussed herein, the present methods and systems may be computer-implemented. FIG. 19 shows a block diagram depicting an environment 1900 comprising non-limiting examples of a computing device 1901 and a server 1902 connected through a network 1904, such as the network 106. The computing device 1901 and/or the server 1902 may be any one of the devices, components, units, or modules shown in FIG. 1-3, 5-7, 9, or 12-16. In an aspect, some or all steps of any described method herein may be performed on a computing device as described herein. The computing device 1901 may comprise one or multiple computers configured to store one or more of a machine learning module 1920, content and user data 1915, and the like. The server 1902 may comprise one or multiple computers configured to store one or more of the machine learning module 1920, the content and user data 1915, and the like. Multiple servers 1902 may communicate with the computing device 1901 via the through the network 1904.

The computing device 1901 and the server 1902 may each be a digital computer that, in terms of hardware architecture, generally includes a processor 1908, memory system 1910, input/output (I/O) interfaces 1912, and network interfaces 1914. These components (608, 1910, 1912, and 1914) are communicatively coupled via a local interface 1916. The local interface 1916 may be, for example, but not limited to, one or more buses or other wired or wireless connections, as is known in the art. The local interface 1916 may have additional elements, which are omitted for simplicity, such as controllers, buffers (caches), drivers, repeaters, and receivers, to enable communications. Further, the local interface may include address, control, and/or data connections to enable appropriate communications among the aforementioned components.

The processor 1908 may be a hardware device for executing software, particularly that stored in memory system 1910. The processor 1908 may be any custom made or commercially available processor, a central processing unit (CPU), an auxiliary processor among several processors associated with the computing device 1901 and the server 1902, a semiconductor-based microprocessor (in the form of a microchip or chip set), or generally any device for executing software instructions. When the computing device 1901 and/or the server 1902 is in operation, the processor 1908 may be configured to execute software stored within the memory system 1910, to communicate data to and from the memory system 1910, and to generally control operations of the computing device 1901 and the server 1902 pursuant to the software.

The I/O interfaces 1912 may be used to receive user input from, and/or for providing system output to, one or more devices or components. User input may be received via, for example, a keyboard and/or a mouse. System output may comprise a display device and a printer (not shown). I/O interfaces 1912 may include, for example, a serial port, a parallel port, a Small Computer System Interface (SCSI), an infrared (IR) interface, a radio frequency (RF) interface, and/or a universal serial bus (USB) interface.

The network interface 1914 may be used to transmit and receive from the computing device 1901 and/or the server 1902 on the network 1904. The network interface 1914 may include, for example, a 10BaseT Ethernet Adaptor, a 100BaseT Ethernet Adaptor, a LAN PHY Ethernet Adaptor, a Token Ring Adaptor, a wireless network adapter (e.g., WiFi, cellular, satellite), or any other suitable network interface device. The network interface 1914 may include address, control, and/or data connections to enable appropriate communications on the network 1904.

The memory system 1910 may include any one or combination of volatile memory elements (e.g., random access memory (RAM, such as DRAM, SRAM, SDRAM, etc.)) and nonvolatile memory elements (e.g., ROM, hard drive, tape, CDROM, DVDROM, etc.). Moreover, the memory system 1910 may incorporate electronic, magnetic, optical, and/or other types of storage media. Note that the memory system 1910 may have a distributed architecture, where various components are situated remote from one another, but may be accessed by the processor 1908.

The software in memory system 1910 may include one or more software programs, each of which comprises an ordered listing of executable instructions for implementing logical functions. In the example of FIG. 19, the software in the memory system 1910 of the computing device 1901 may comprise the training module 1720 (or subcomponents thereof), the training data 320, and a suitable operating system (O/S) 1918. In the example of FIG. 19, the software in the memory system 1910 of the server 1902 may comprise, the video data 1924, and a suitable operating system (O/S) 1918. The operating system 1918 essentially controls the execution of other computer programs and provides scheduling, input-output control, file and data management, memory management, and communication control and related services.

For purposes of illustration, application programs and other executable program components such as the operating system 1918 are illustrated herein as discrete blocks, although it is recognized that such programs and components may reside at various times in different storage components of the computing device 1901 and/or the server 1902. An implementation of the training module 1720 may be stored on or transmitted across some form of computer readable media. Any of the disclosed methods may be performed by computer readable instructions embodied on computer readable media. Computer readable media may be any available media that may be accessed by a computer. By way of example and not meant to be limiting, computer readable media may comprise "computer storage media" and "communications media". "Computer storage media" may comprise volatile and non-volatile, removable and non-removable media implemented in any methods or technology for storage of information such as computer readable instructions, data structures, program modules, or other data. Exemplary computer storage media may comprise RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which may be used to store the desired information, and which may be accessed by a computer.

FIG. 20 shows a flowchart of an example method 2000 for content recommendations based on user activity data. The method 2000 may be performed in whole or in part by a single computing device, a plurality of computing devices, and the like. For example, any one of the devices, components, units, or modules shown in FIG. 1-3, 5-7, 9, or 12-15 may be configured to perform the method 2000. The computing device(s) that performs the steps of the method 2000 may comprise a machine learning model, such as the at least one machine learning model 1530 and/or the machine learning model 1730.

At step 2010, the computing device (e.g., the analytics subsystem 142) may receive first activity data. As described herein, user interaction with the client application 106 (e.g., consumption/engagement with media assets) may generate activity data (e.g., user activity data). The activity data may be indicative of a user's engagement/interaction(s) with media assets via the client application 106. For example, the first activity may be indicative of a plurality of first engagements with a first plurality of media assets (e.g., one or more of the media assets 166) via a first user device (e.g., a user device 102) and the client application 106.

At step 2020, the computing device may determine metadata associated with each media asset of the first plurality of media assets. For example, the metadata associated with each media asset of the first plurality of media assets may comprise at least one first media asset classification. The at least one first media asset classification may correspond to different classifications of media assets. Each of those classifications may be associated with a type of user behavior. These classifications may be determined by the client, by the analytics subsystem 142, a third-party, a combination there, and/or the like.

At step 2030, the computing device may determine, based on the at least one first media asset classification, at least one machine learning model of a plurality of machine learning models (e.g., the at least one machine learning model 1530). Each of the plurality of machine learning models may be trained using training activity data/engagements (referred to herein as "training activity data") and/or training recommendation data. The at least one machine learning model may be trained such that an input of the first activity data may result in an output of at least one content recommendation. For example, the at least one content recommendation may comprise a recommendation for at least one media asset. The at least one media asset may be associated with at least one second media asset classification, which may differ from the at least one first media asset classification. For example, the at least one first media asset classification may comprise research content, while the at least one second media asset classification may comprise industry content.

The first activity data may be associated with a first UIC. When training the at least one machine learning model, the computing device may determine/retrieve the training activity data and the training recommendation data based on a plurality of UICs for other users that are similar to the first UIC. For example, based on the first UIC associated with the first user profile, a plurality of similar user profiles associated with corresponding UICs that are similar to the first interest cloud may be determined/retrieved. Some users associated with the plurality of similar user profiles may be "converting users," while other users associated with the plurality of similar user profiles may be "non-converting user." A first subset of the plurality of similar user profiles may be associated with the non-converting users, and a second subset of the plurality of similar user profiles may be associated with the converting users. For example, the first subset and the second subset may be used separately for purposes of training the at least one machine learning model.

Based on the plurality of similar user profiles, second activity data indicative of a plurality of second engagements associated with the plurality of similar user profiles may be determined/retrieved. The training activity data and/or the training recommendation data may be based on (e.g., derived from) the second activity data (e.g., the plurality of second engagements). The plurality of second engagements may be associated with a second plurality of media assets, which may have at least one media asset in common with the first plurality of media assets described above. Each media asset of the second plurality of media assets may comprise or be associated with metadata. The metadata associated with each media asset of the second plurality of media assets may comprise or be indicative of the at least one second media asset classification described above. The computing device may therefore train the at least one machine learning model based on the second plurality of engagements and the plurality of similar user profiles.

At step 2040, the computing device may determine at least one content recommendation. For example, once trained, the at least one machine learning model may be configured to receive an input of activity data, such as the first activity data, and to determine the at least one content recommendation on that basis. At step 2050, the computing device may send the at least one content recommendation. For example, the computing device may send the at least one content recommendation to the first user device via the client application 106. The computing device may send the at least one content recommendation to the first user device as a notification, an instruction, a message, a combination thereof, and/or the like. For example, sending the at least one content recommendation may comprise the computing device causing the first user device to output the at least one content recommendation (e.g., video, audio, notification(s), message(s), etc.) via the client application 106. As another example, sending the at least one content recommendation may comprise the computing device causing the client application 106 to output (e.g., present, display, show, etc.) at least one media asset associated with the at least one content recommendation. As another example, sending the at least one content recommendation may comprise the computing device sending a first instruction to the first user device, and the first instruction may be configured to cause the client application 106 to output a notification associated with the at least one media asset. In still a further example, sending the at least one content recommendation may comprise the computing device sending a second instruction to the first user device, and the second instruction may be configured to cause the client application 106 to add the at least one media asset to a playlist associated with the first user profile. Other examples are possible as well.

While specific configurations have been described, it is not intended that the scope be limited to the particular configurations set forth, as the configurations herein are intended in all respects to be possible configurations rather than restrictive. Unless otherwise expressly stated, it is in no way intended that any method set forth herein be construed as requiring that its steps be performed in a specific order. Accordingly, where a method claim does not actually recite an order to be followed by its steps or it is not otherwise specifically stated in the claims or descriptions that the steps are to be limited to a specific order, it is in no way intended that an order be inferred, in any respect. This holds for any possible non-express basis for interpretation, including: matters of logic with respect to arrangement of steps or operational flow; plain meaning derived from grammatical organization or punctuation; the number or type of configurations described in the specification.

It will be apparent to those skilled in the art that various modifications and variations may be made without departing from the scope or spirit. Other configurations will be apparent to those skilled in the art from consideration of the specification and practice described herein. It is intended that the specification and described configurations be considered as exemplary only, with a true scope and spirit being indicated by the following claims.

What is claimed is:

1. A method comprising:
  receiving, by an analytics subsystem of a computing device, first activity data indicative of a plurality of first engagements of a first user device with a client application, wherein the plurality of first engagements are associated with a first plurality of media assets;
  determining metadata associated with each media asset of the first plurality of media assets, wherein the metadata associated with each media asset of the first plurality of media assets comprises at least one first media asset classification;
  determining, based on the at least one first media asset classification, at least one machine learning model of a plurality of machine learning models;
  determining, by the at least one machine learning model, based on the first activity data, at least one content recommendation, wherein the at least one content recommendation comprises at least one media asset associated with at least one second media asset classification; and
  sending, to the first user device, the at least one content recommendation.

2. The method of claim 1, wherein the at least one first media asset classification comprises: educational content or research content.

3. The method of claim 1, wherein the at least one first media asset classification comprises: solution content, industry content, or comparison content.

4. The method of claim 1, wherein the at least one first media asset classification comprises: entity content, implementation content, or demonstration content.

5. The method of claim 1, further comprising:
  determining, based on a first interest cloud associated with a first user profile, a plurality of similar user profiles associated with corresponding interest clouds that are similar to the first interest cloud;
  determining, based on the plurality of similar user profiles, second activity data indicative of a plurality of second engagements associated with the plurality of similar user profiles, wherein the plurality of second engagements are associated with a second plurality of media assets, and wherein metadata associated with each media asset of the second plurality of media assets comprises the at least one second media asset classification; and
  training, based on the plurality of second engagements and the plurality of similar user profiles, the at least one machine learning model.

6. The method of claim 5, wherein a first subset of the plurality of similar user profiles are associated with non-converting users, and wherein a second subset of the plurality of similar user profiles are associated with converting users.

7. The method of claim 1, wherein the at least one first media asset classification for the first activity data is associated with an awareness stage, a consideration stage, or a decision stage.

8. The method of claim 1, wherein the at least one second media asset classification is associated with an awareness stage, a consideration stage, or a decision stage.

9. The method of claim 1, wherein the at least one second media asset classification differs from the at least one first media asset classification.

10. The method of claim 1, wherein sending the at least one content recommendation comprises at least one of:
  sending, to the first user device, a message configured to cause the first user device to output, via the client application, the at least one media asset;
  sending, to the first user device, a first instruction configured to cause the client application to output a notification associated with the at least one media asset; or
  sending, to the first user device, a second instruction configured to cause the client application to add the at least one media asset to a playlist associated with a first user profile.

11. An apparatus comprising:
  one or more processors and;
  processor-executable instructions that, when executed by the one or more processors, cause the apparatus to:
    receive, by an analytics subsystem, first activity data indicative of a plurality of first engagements of a first user device with a client application, wherein the plurality of first engagements are associated with a first plurality of media assets;
    determine metadata associated with each media asset of the first plurality of media assets, wherein the metadata associated with each media asset of the first plurality of media assets comprises at least one first media asset classification;
    determine, based on the at least one first media asset classification, at least one machine learning model of a plurality of machine learning models;
    determine, by the at least one machine learning model, based on the first activity data, at least one content recommendation, wherein the at least one content recommendation comprises at least one media asset associated with at least one second media asset classification; and send, to the first user device, the at least one content recommendation.

12. The apparatus of claim 11, wherein the at least one first media asset classification comprises: educational content or research content.

13. The apparatus of claim 11, wherein the at least one first media asset classification comprises: solution content, industry content, or comparison content.

14. The apparatus of claim 11, wherein the at least one first media asset classification comprises: entity content, implementation content, or demonstration content.

15. The apparatus of claim 11, wherein the processor-executable instructions further cause the apparatus to:

determine, based on a first interest cloud associated with a first user profile, a plurality of similar user profiles associated with corresponding interest clouds that are similar to the first interest cloud;

determine, based on the plurality of similar user profiles, second activity data indicative of a plurality of second engagements associated with the plurality of similar user profiles, wherein the plurality of second engagements are associated with a second plurality of media assets, and wherein metadata associated with each media asset of the second plurality of media assets comprises the at least one second media asset classification; and train, based on the plurality of second engagements and the plurality of similar user profiles, the at least one machine learning model.

16. The apparatus of claim 15, wherein a first subset of the plurality of similar user profiles are associated with non-converting users, and wherein a second subset of the plurality of similar user profiles are associated with converting users.

17. The apparatus of claim 11, wherein the at least one first media asset classification for the first activity data is associated with an awareness stage, a consideration stage, or a decision stage.

18. The apparatus of claim 11, wherein the at least one second media asset classification is associated with an awareness stage, a consideration stage, or a decision stage.

19. The apparatus of claim 11, wherein the at least one second media asset classification differs from the at least one first media asset classification.

20. The apparatus of claim 11, wherein the processor-executable instructions that cause the apparatus to send the at least one content recommendation further cause the apparatus to at least one of:

send, to the first user device, a message configured to cause the first user device to output, via the client application, the at least one media asset;

send, to the first user device, a first instruction configured to cause the client application to output a notification associated with the at least one media asset; or send, to the first user device, a second instruction configured to cause the client application to add the at least one media asset to a playlist associated with a first user profile.

* * * * *